United States Patent
Choi et al.

(10) Patent No.: US 12,189,464 B2
(45) Date of Patent: Jan. 7, 2025

(54) METHOD OF MANAGING DEBUGGING LOG IN STORAGE DEVICE

(71) Applicant: Samsung Electronics Co., Ltd., Suwon-si (KR)

(72) Inventors: Bomi Choi, Seoul (KR); Sunghoon Chun, Hwaseong-si (KR); Seongyeon Kim, Hwaseong-si (KR); Jaeyoung Eum, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 356 days.

(21) Appl. No.: 17/711,421

(22) Filed: Apr. 1, 2022

(65) Prior Publication Data
US 2023/0004320 A1    Jan. 5, 2023

(30) Foreign Application Priority Data

Jul. 5, 2021    (KR) .................. 10-2021-0087795

(51) Int. Cl.
G06F 11/07    (2006.01)

(52) U.S. Cl.
CPC ...... G06F 11/0787 (2013.01); G06F 11/0727 (2013.01)

(58) Field of Classification Search
CPC ............. G06F 11/0727; G06F 11/0778; G06F 11/0787
USPC .................................................. 714/38.11, 45
See application file for complete search history.

(56) References Cited

U.S. PATENT DOCUMENTS

| | | | |
|---|---|---|---|
| 7,679,133 B2 | 3/2010 | Son et al. | |
| 8,423,830 B2 * | 4/2013 | Yu ....................... | G06F 11/3648 714/6.1 |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,966,319 B2 | 2/2015 | Fai et al. | |
| 8,977,831 B2 * | 3/2015 | Moshayedi ............ | G11C 5/143 714/22 |
| 9,875,170 B2 | 1/2018 | Kim | |
| 10,474,618 B2 | 11/2019 | Anderson et al. | |
| 10,705,902 B2 | 7/2020 | Sasidharan et al. | |
| 10,817,405 B2 | 10/2020 | Kim | |
| 10,831,657 B2 * | 11/2020 | Lappi .................. | G06F 11/0727 |
| 10,891,052 B2 | 1/2021 | Navon et al. | |
| 11,269,707 B2 * | 3/2022 | Liang .................. | G06F 11/0778 |
| 2005/0204107 A1 * | 9/2005 | Narayan ............... | G06F 11/073 711/162 |
| 2011/0233648 A1 | 9/2011 | Seol et al. | |

(Continued)

*Primary Examiner* — Joseph R Kudirka
(74) *Attorney, Agent, or Firm* — Harness, Dickey & Pierce, P.L.C.

(57) ABSTRACT

In a method of managing a debugging log in a storage device, an event trigger signal is generated based on an external power supply voltage and a plurality of configuration control signals. The event trigger signal is activated in response to an event of interest being issued for generating and storing the debugging log. The debugging log represents information associated with errors occurring in the storage device. The debugging log is generated based on the event trigger signal. The debugging log is stored in a nonvolatile memory. The event of interest includes at least one of a power up event a reset event, a link up event, a link down event or a power down event.

19 Claims, 23 Drawing Sheets

(56) References Cited

U.S. PATENT DOCUMENTS

| | | | |
|---|---|---|---|
| 2016/0070486 A1* | 3/2016 | Anderson | G06F 9/44 |
| | | | 711/103 |
| 2018/0276052 A1 | 9/2018 | Kim et al. | |
| 2019/0163574 A1 | 5/2019 | Jun | |
| 2020/0301780 A1* | 9/2020 | Kim | G06F 11/108 |
| 2023/0074108 A1* | 3/2023 | Yoon | G06F 3/0604 |

* cited by examiner

METHOD OF MANAGING DEBUGGING LOG IN STORAGE DEVICE

CROSS-REFERENCE TO RELATED APPLICATION

This application claims priority under 35 USC § 119 to Korean Patent Application No. 10-2021-0087795 filed on Jul. 5, 2021 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of managing debugging logs in storage devices.

2. Description of the Related Art

One or more semiconductor memory devices may be used in data storage devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Various systems, e.g., a laptop computer, a car, an airplane, a drone, etc., have adopted the SSDs for data storage.

As technology has developed and the performance of storage devices has increased, the operating speed of the storage devices have increased, and the firmware thereof is configured such that the storage devices include various functions. Such increases in the operating speed or functions may increase the likelihood of operational errors in the storage devices. A separate debugging technique for extracting error information may be used to detect and/or correct such errors. For example, a debugging may be performed using debugging logs collected in the storage devices.

SUMMARY

At least one example embodiment of the present disclosure provides a method of managing a debugging log in a storage device capable of efficiently generating and storing the debugging log that is information associated with errors occurring in the storage device.

According to example embodiments, in a method of managing a debugging log in a storage device, an event trigger signal is generated, by a storage controller included in the storage device, based on an external power supply voltage and a plurality of configuration control signals. The event trigger signal is activated in response to an event of interest being issued for generating and storing the debugging log. The debugging log represents information associated with errors occurring in the storage device. The debugging log is generated, by the storage controller, based on the event trigger signal. The debugging log is stored in a nonvolatile memory included in the storage device. The event of interest includes at least one of a power up event in which the external power supply voltage is activated, a reset event for initializing the storage controller, a link up event in which a communication establishment between a host device disposed outside the storage device and the storage controller is completed, a link down event in which the communication establishment between the host device and the storage controller is released, or a power down event in which the external power supply voltage is deactivated.

According to example embodiments, in a method of managing a debugging log in a storage device, an event trigger signal is generated, by a storage controller included in the storage device, based on an external power supply voltage and a plurality of configuration control signals. The event trigger signal is activated in response to an event of interest being issued for generating and storing the debugging log. The debugging log represents information associated with errors occurring in the storage device. The debugging log is generated, by the storage controller, based on the event trigger signal. An abnormal event trigger signal is generated, by the storage controller, based on the external power supply voltage and the plurality of configuration control signals. The abnormal event trigger signal is activated in response to the event of interest corresponding to an abnormal event. In response to the event of interest corresponding to the abnormal event, the debugging log is immediately stored in a nonvolatile memory included in the storage device based on the abnormal event trigger signal. In response to the event of interest corresponding to a normal event, the debugging log is temporarily stored in a buffer memory included in the storage device, and then the debugging log is stored in the nonvolatile memory.

According to example embodiments, in a method of managing a debugging log in a storage device, an event trigger signal is generated, by a storage controller included in the storage device, based on an external power supply voltage and a plurality of configuration control signals. The event trigger signal is activated in response to a plurality of events of interest being issued for generating and storing a plurality of debugging logs. The plurality of debugging logs represent information associated with errors occurring in the storage device. The plurality of debugging logs are generated, by the storage controller, based on the event trigger signal. The plurality of debugging logs are stored in a nonvolatile memory included in the storage device. The nonvolatile memory includes a plurality of memory blocks. Two of the plurality of memory blocks are set as a first debugging memory block and a second debugging memory block. The first and second debugging memory blocks are configured to store the plurality of debugging logs. First to M-th debugging logs among the plurality of debugging logs are sequentially stored in the first debugging memory block, where M is a natural number greater than or equal to two. (M+1)-th to 2M-th debugging logs among the plurality of debugging logs are sequentially stored in the second debugging memory block. (2M+1)-th to 3M-th debugging logs among the plurality of debugging logs are sequentially stored in the first debugging memory block after an erase operation is performed on the first debugging memory block.

In the method of managing the debugging log in the storage device according to example embodiments, the situation in which the errors occur intensively and/or frequently may be defined as the event of interest, and the debugging log may be generated, extracted, and stored when the event of interest is issued. Accordingly, data required, or sufficient, for debugging may be efficiently obtained. In an environment where power cycles in which power is turned on/off occur relatively frequently, such as a personal computer, the error analysis may be difficult when the debugging log is lost. When the debugging log is generated, extracted, and stored by monitoring the event of interest according to example embodiments, the log history and the context of errors may be checked even after the power cycles, and thus the error analysis may be efficiently performed.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
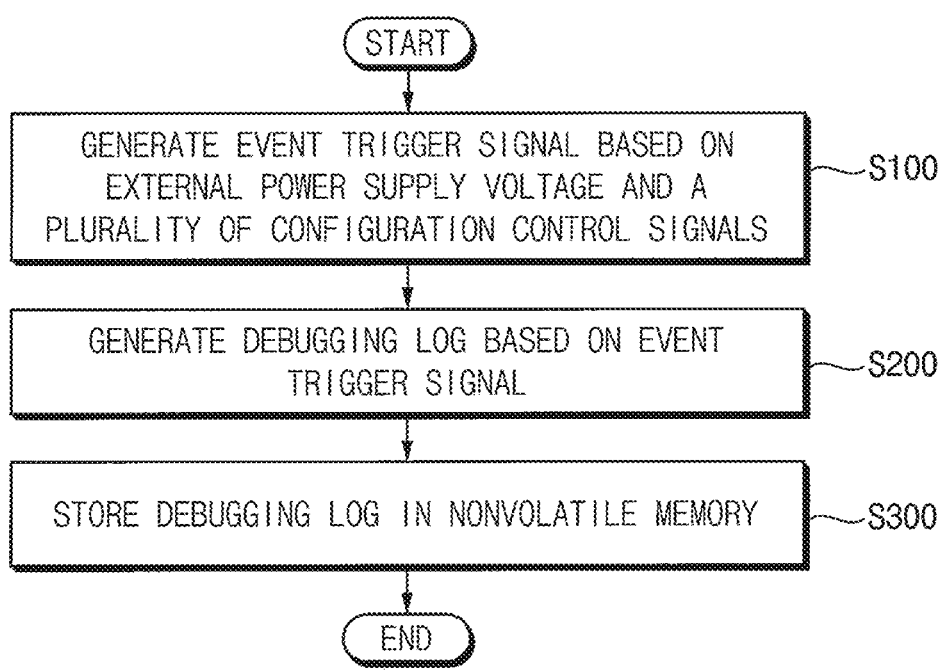
FIG. 1 is a flowchart illustrating a method of managing a debugging log in a storage device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of managing a debugging log in a storage device according to example embodiments.

Referring to FIG. 1, a method of managing a debugging log is performed by a storage device that includes a nonvolatile memory and/or a storage controller. The storage device may further include a buffer memory. The storage device operates based on an external power supply voltage and/or a command that are received from a host device disposed outside the storage device, and exchanges a plurality of configuration control signals and/or data with the host device. Detailed configurations of the storage device and a storage system including the storage device will be described with reference to FIGS. 3, 4 and 5.

In the method of managing the debugging log in the storage device according to example embodiments, the storage controller generates an event trigger signal based on the external power supply voltage and/or the plurality of configuration (or setup) control signals (step S100). The event trigger signal is activated when an event of interest is issued for generating and/or storing the debugging log.

The debugging log represents information associated with or related to errors (or bugs) occurring in the storage device (or errors occurring between the storage device and the host device). The debugging log may be referred to as debug log or data for debugging. For example, the debugging log may provide useful information about bugs that are difficult to reproduce, such as that errors that occur in a user environment but are difficult to produce in a test environment.

The event of interest represents an event in which the error occurrence in the storage device is concentrated, that is, a situation or environment in which the errors may occur intensively and/or frequently. The event of interest may be referred to as an error concentrated event. For example, the storage controller may monitor whether the event of interest is issued, and may activate the event trigger signal when the event of interest is issued. The monitoring operation will be described with reference to FIG. 2.

In some example embodiments, the event of interest may include at least one of a power up event in which the external power supply voltage is activated, a reset event for initializing the storage controller, a link up event in which a communication establishment (or setup) between the host device and the storage controller is completed, a link down event in which the communication establishment between the host device and the storage controller is released, and/or a power down event in which the external power supply voltage is deactivated. The event of interest will be described with reference to FIG. 6.

In some example embodiments, the event of interest may further include a host idle event in which the host device maintains an idle state for more than a predetermined (or alternately given) reference time interval. In some example embodiments, the event of interest may further include a thermal event in which an operating temperature of the storage device increases higher than a predetermined (or alternately given) reference temperature. However, example embodiments are not limited thereto, and the event of interest may further include various events having a relatively high probability of the error occurrence.

The storage controller generates the debugging log based on the event trigger signal (step S200). The debugging log is stored in the nonvolatile memory (step S300). For example, as will be described with reference to FIG. 5, the nonvolatile memory may include a plurality of memory blocks, some of the plurality of memory blocks may be set as a debugging memory block, and the debugging log may be stored in the debugging memory block. Step S300 will be described with reference to FIGS. 7 through 10.

Although FIG. 1 illustrates that one debugging log is generated and stored, example embodiments are not limited thereto. For example, as will be described with reference to FIGS. 2 through 16, the debugging log may be continuously and repeatedly generated and stored whenever the event of interest is issued, and thus a plurality of debugging logs may be generated and stored.

In the method of managing the debugging log in the storage device according to example embodiments, the situation in which the errors occur intensively and/or frequently may be defined as the event of interest, and the debugging log may be generated, extracted, and/or stored when the event of interest is issued. Accordingly, data required, or sufficient, for debugging may be efficiently obtained. In an environment where power cycles in which power is turned on/off occur relatively frequently, such as a personal computer (PC), the error analysis may be difficult when the debugging log is lost. When the debugging log is generated, extracted, and/or stored by monitoring the event of interest according to example embodiments, the log history and/or the context of errors may be checked even after the power cycles, and thus the error analysis may be efficiently performed. In some example embodiments, a separate debugging technique may refer to the debugging log to extract error information used to detect and/or correct errors. Accordingly, a debugging technique according to example embodiments may more accurately determine and/or correct errors in a storage device, and integrity of data stored on the storage device may be more effectively maintained.

Figure 2:
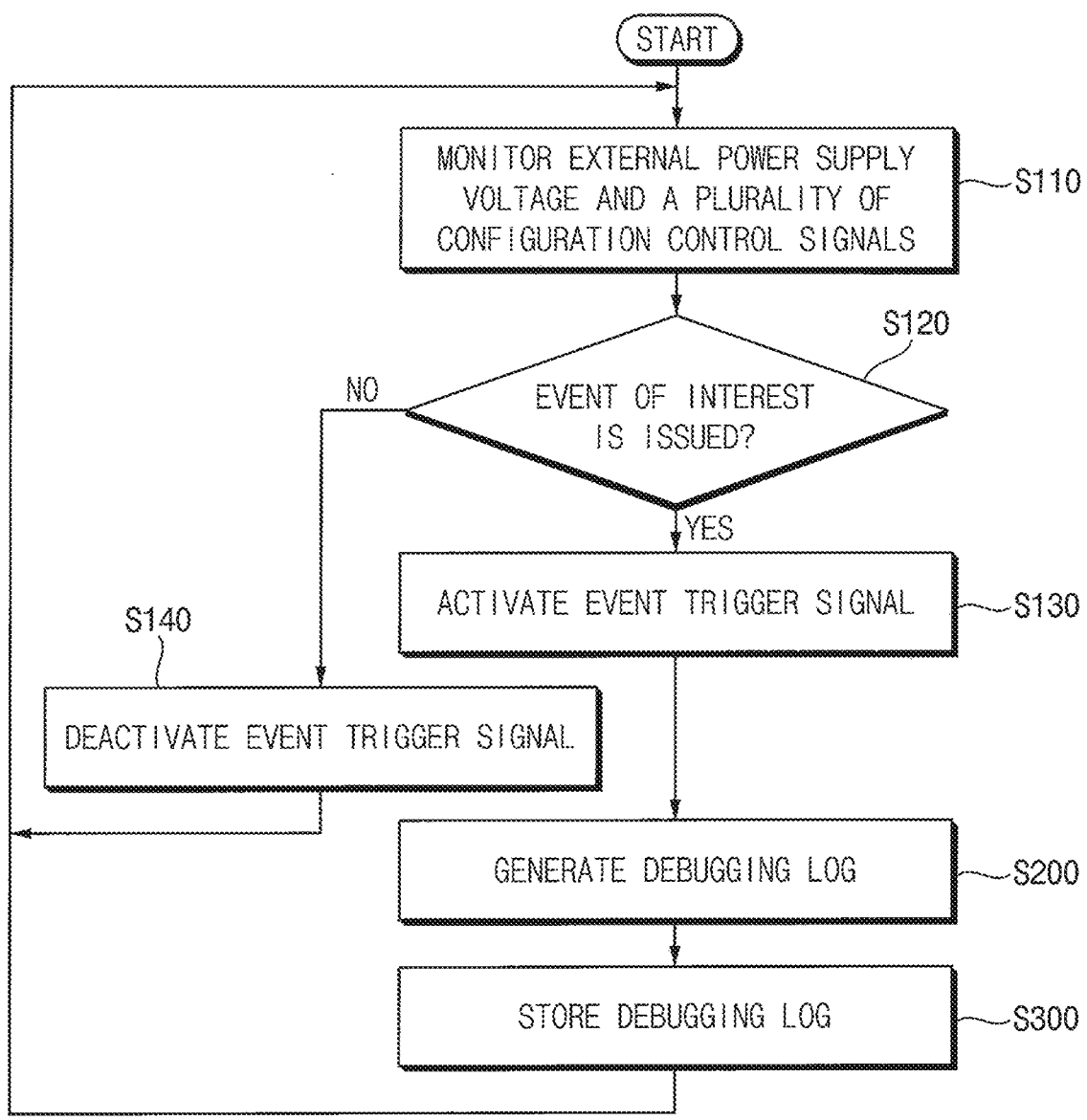
FIG. 2 is a flowchart illustrating an example of a method of managing a debugging log in a storage device of FIG. 1.

FIG. 2 is a flowchart illustrating an example of a method of managing a debugging log in a storage device of FIG. 1.

Referring to FIGS. 1 and 2, when generating the event trigger signal (step S100), the storage controller may monitor the external power supply voltage and the plurality of configuration control signals (step S110). The types of the plurality of configuration control signals will be described with reference to FIGS. 6 and 15.

When it is determined, based on a result of the monitoring operation in step S110, that the event of interest is issued (step S120: YES), e.g., when at least one of the power up event, the reset event, the link up event, the link down event, the power down event, the host idle event and/or the thermal event occurs, the event trigger signal may be activated (step S130). For example, the event trigger signal may basically have an inactive state, and may temporarily have an active state only when the event of interest is issued.

When it is determined, based on a result of the monitoring in step S110, that the event of interest is not issued (step S120: NO), the event trigger signal may be deactivated (step S140). For example, the inactive state of the event trigger signal may be maintained.

Based on the activated event trigger signal, the debugging log may be generated (step S200), and the debugging log may be stored in the nonvolatile memory (step S300). After steps S200 and S300 are performed, the activated event trigger signal may be deactivated.

After it is determined that the event of interest is issued and the debugging log is generated and/or stored (e.g., after steps S130, S200 and/or S300 are performed), and after it is determined that the event of interest is not issued and the event trigger signal is deactivated (e.g., after step S140 is performed), the monitoring operation of step S110 may be performed again. In other words, it may be continuously and/or repeatedly monitored whether the event of interests are issued, and thus the plurality of debugging logs may be continuously and repeatedly generated and/or stored whenever the event of interests are issued.

Figure 3:
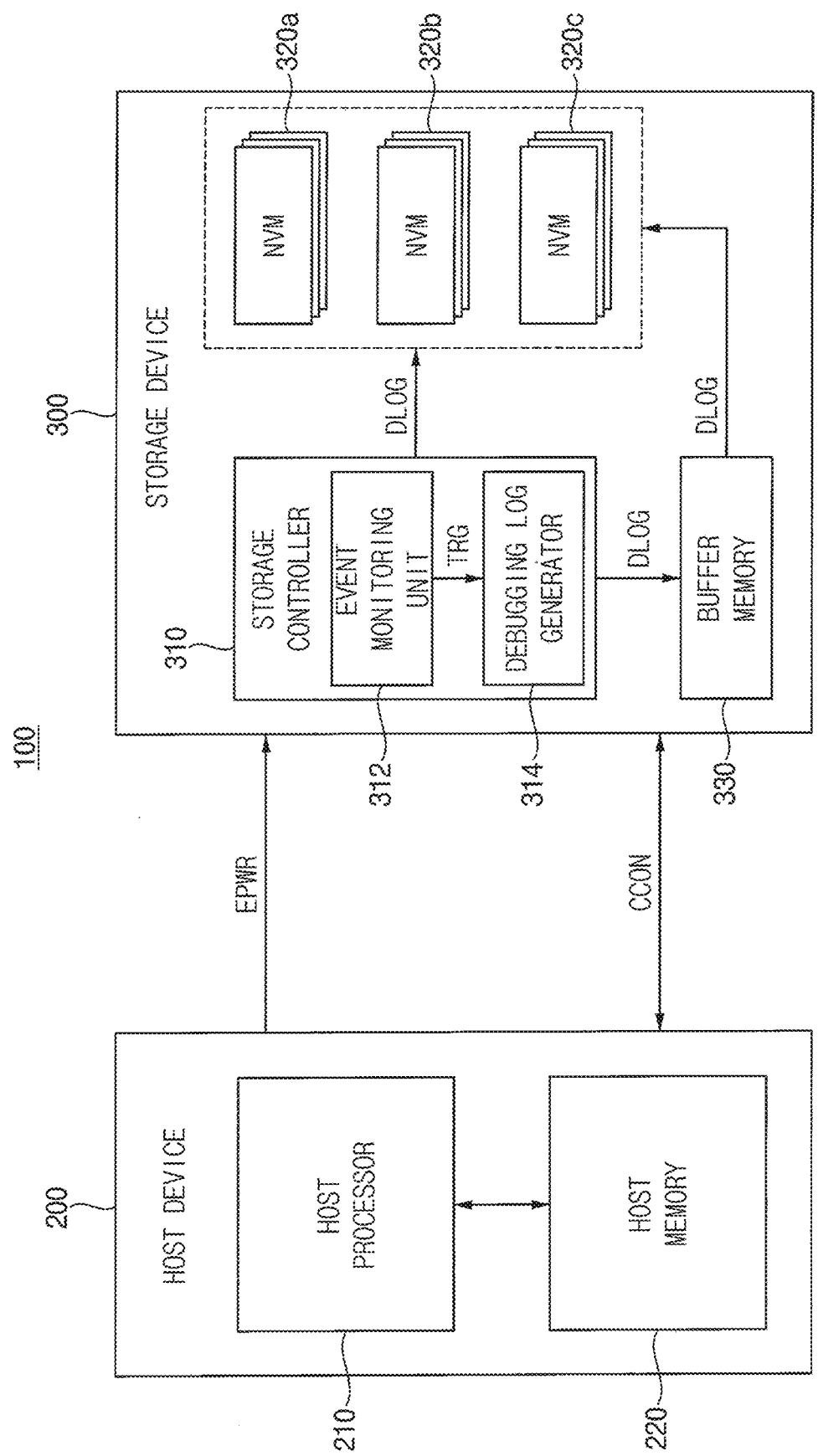
FIG. 3 is a block diagram illustrating a storage device and a storage system including the storage device according to example embodiments.

FIG. 3 is a block diagram illustrating a storage device and a storage system including the storage device according to example embodiments.

Referring to FIG. 3, a storage system 100 includes a host device 200 and a storage device 300.

The host device 200 controls overall operations of the storage system 100. The host device 200 may include a host processor 210 and/or a host memory 220.

The host processor 210 may control an operation of the host device 200. For example, the host processor 210 may execute an operating system (OS). For example, the operating system may include a file system for file management and/or a device driver for controlling peripheral devices including the storage device 300 at the operating system level. For example, the host processor 210 may include at least one of various processing units, e.g., a central processing unit (CPU), and/or the like.

The host memory 220 may store instructions and/or data that are executed and/or processed by the host processor 210. For example, the host memory 220 may include at least one of various volatile memories, e.g., a dynamic random access memory (DRAM), and/or the like.

The storage device 300 is accessed by the host device 200. The storage device 300 may include a storage controller 310, a plurality of nonvolatile memories 320a, 320b and/or 320c, and/or a buffer memory 330.

The storage controller 310 may control an operation of the storage device 300. For example, the storage controller 310 may receive an external power supply voltage EPWR from the host device 200, may exchange a plurality of configuration control signals CCON with the host device 200, and/or may operate based on the external power supply voltage EPWR and/or the plurality of configuration control signals CCON. For example, the storage controller 310 may control a data write operation and/or a data read operation of the plurality of nonvolatile memories 320a, 320b and/or 320c based on a command and/or data that are received from the host device 200.

The storage controller 310 may include an event monitoring unit 312 and/or a debugging log generator 314.

The event monitoring unit 312 may generate at least one trigger signal TRG by monitoring the external power supply voltage EPWR and/or the plurality of configuration control signals CCON. For example, the at least one trigger signal TRG may include the event trigger signal described with reference to FIG. 1. For example, the at least one trigger signal TRG may further include an abnormal event trigger signal, which will be described with reference to FIG. 11. The debugging log generator 314 may generate a debugging log DLOG, which represents information associated with errors occurring in the storage device 300, based on the at least one trigger signal TRG.

The storage controller 310 may perform the method of managing the debugging log according to example embodiments described with reference to FIG. 1. For example, the event monitoring unit 312 may generate the event trigger signal, which is activated when an event of interest is issued for generating and storing the debugging log DLOG, based on the external power supply voltage EPWR and the plurality of configuration control signals CCON. The debugging log generator 314 may generate the debugging log DLOG based on the event trigger signal, and may store the debugging log DLOG in the nonvolatile memories 320a, 320b and/or 320c. In some example embodiments, the debugging log DLOG may be directly provided to the nonvolatile memories 320a, 320b and/or 320c. In other example embodiments, the debugging log DLOG may be provided to the nonvolatile memories 320a, 320b and/or 320c through the buffer memory 330. In addition, the storage controller 310 may perform a method of managing a debugging log according to example embodiments, which will be described with reference to FIGS. 11, 16 and 20.

The plurality of nonvolatile memories 320a, 320b and/or 320c may store a plurality of data. For example, the plurality of nonvolatile memories 320a, 320b and/or 320c may store the meta data, various user data, and/or the like, and/or may store the debugging log DLOG.

In some example embodiments, each or one or more of the plurality of nonvolatile memories 320a, 320b and/or 320c may include a NAND flash memory. In other example embodiments, each or one or more of the plurality of nonvolatile memories 320a, 320b and/or 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), and/or the like.

The buffer memory 330 may store instructions and/or data that are executed and/or processed by the storage controller 310, may temporarily store data stored in or to be stored into the plurality of nonvolatile memories 320a, 320b and/or 320c, and/or may temporarily store the debugging log DLOG. For example, the buffer memory 330 may include at least one of various volatile memories, e.g., a static random access memory (SRAM), a DRAM, and/or the like.

In some example embodiments, the storage device 300 may be a solid state drive (SSD). In other example embodiments, the storage device 300 may be a universal flash storage (UFS), a multi-media card (MMC) and/or an embedded multi-media card (eMMC). Alternatively, the storage device 300 may be one of a secure digital (SD) card, a micro SD card, a memory stick, a chip card, a universal serial bus (USB) card, a smart card, a compact flash (CF) card, and/or the like.

In some example embodiments, the storage device 300 may be connected to the host device 200 via a block accessible interface which may include, for example, a UFS, an eMMC, a serial advanced technology attachment (SATA) bus, a nonvolatile memory express (NVMe) bus, a serial attached SCSI (SAS) bus, and/or the like. The storage device 300 may use a block accessible address space corresponding to an access size of the plurality of nonvolatile memories 320a, 320b and/or 320c to provide the block accessible interface to the host device 200, for allowing the access by units of a memory block with respect to data stored in the plurality of nonvolatile memories 320a, 320b and/or 320c.

In some example embodiments, the storage system 100 may be any computing system, such as a personal computer (PC), a server computer, a data center, a workstation, a digital television, a set-top box, a navigation system, etc. In other example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 4:
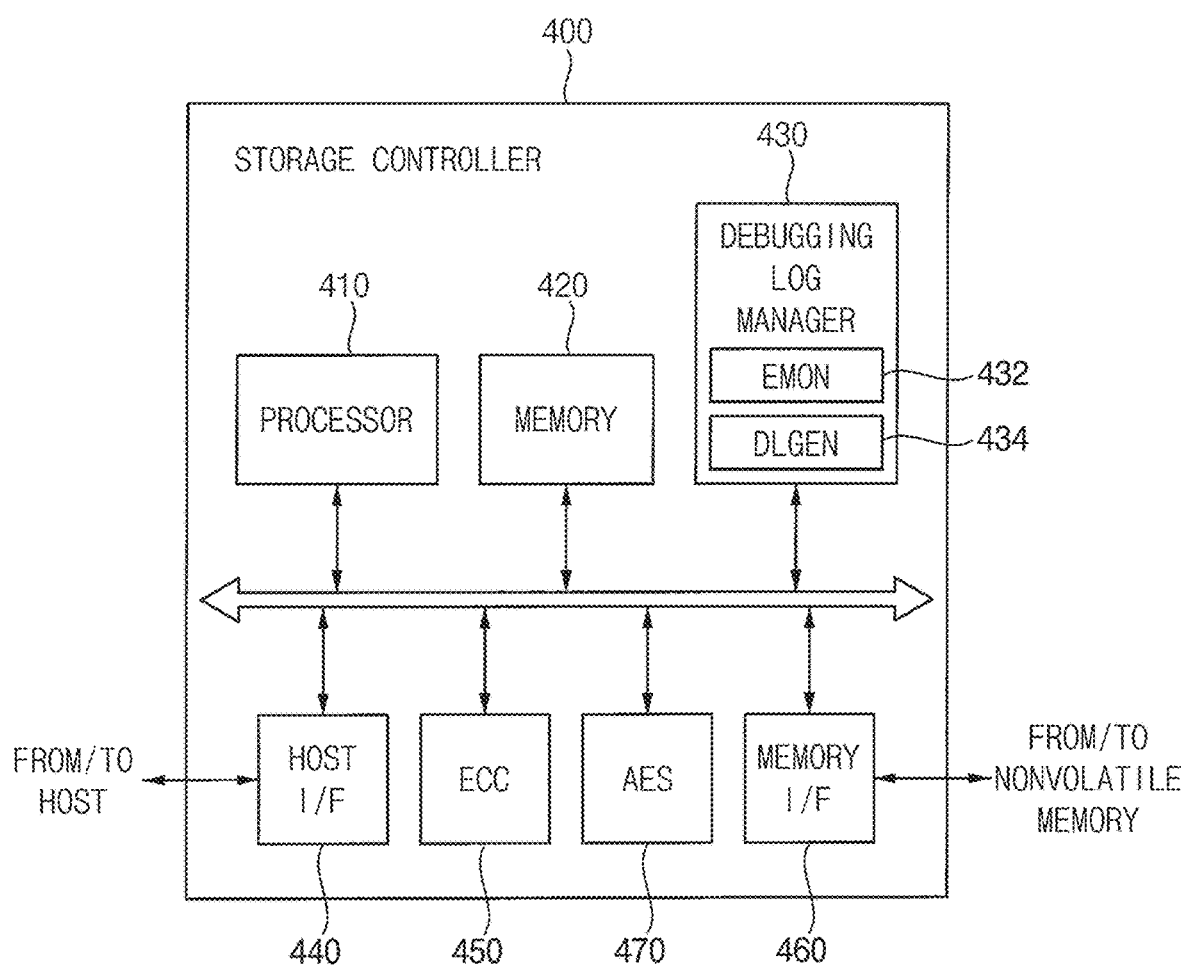
FIG. 4 is a block diagram illustrating an example of a storage controller included in a storage device according to example embodiments.

FIG. 4 is a block diagram illustrating an example of a storage controller included in a storage device according to example embodiments.

Referring to FIG. 4, a storage controller 400 may include a processor 410, a memory 420, a debugging log manager 430, a host interface 440, an error correction code (ECC) engine 450, a memory interface 460 and/or an advanced encryption standard (AES) engine 470.

The processor 410 may control an operation of the storage controller 400 in response to a command received via the host interface 440 from a host device (e.g., the host device 200 in FIG. 3). For example, the processor 410 may control an operation of a storage device (e.g., the storage device 300 in FIG. 3), and/or may control respective components by employing firmware for operating the storage device.

The memory 420 may store instructions and data executed and processed by the processor 410. For example, the memory 420 may be implemented with a volatile memory, such as a DRAM, a SRAM, a cache memory, and/or the like.

The debugging log manager 430 may perform the method of managing the debugging log according to example embodiments, and may include an event monitoring unit (EMON) 432 and a debugging log generator (DLGEN) 434. The event monitoring unit 432 and the debugging log generator 434 may be substantially the same as the event monitoring unit 312 and the debugging log generator 314 in FIG. 3, respectively. In some example embodiments, at least a part of the debugging log manager 430 may be implemented as hardware. For example, at least a part of the debugging log manager 430 may be included in a computer-based electronic system. In other example embodiments, at least a part of the debugging log manager 430 may be implemented as instruction codes or program routines (e.g., a software program). For example, the instruction codes or the program routines may be executed by a computer-based electronic system, and may be stored in any storage device located inside and/or outside the computer-based electronic system.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., and/or may perform ECC encoding and ECC decoding using above-described codes and/or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 460 may exchange data with a nonvolatile memory (e.g., the nonvolatile memories 320a, 320b and/or 320c in FIG. 3). The memory interface 460 may transfer data to the nonvolatile memory, or may receive data read from the nonvolatile memory. In some example embodiments, the memory interface 460 may be connected to the nonvolatile memory via one channel. In other example embodiments, the memory interface 460 may be connected to the nonvolatile memory via two or more channels. For example, the memory interface 460 may be configured to comply with a standard protocol, such as Toggle and/or open NAND flash interface (ONFI).

The AES engine 470 may perform at least one of an encryption operation and/or a decryption operation on data input to the storage controller 400 by using a symmetric-key algorithm. Although not illustrated in detail, the AES engine 470 may include an encryption module and/or a decryption module. For example, the encryption module and the decryption module may be implemented as separate modules. For another example, one module capable of performing both encryption and decryption operations may be implemented in the AES engine 470.

Figure 5:
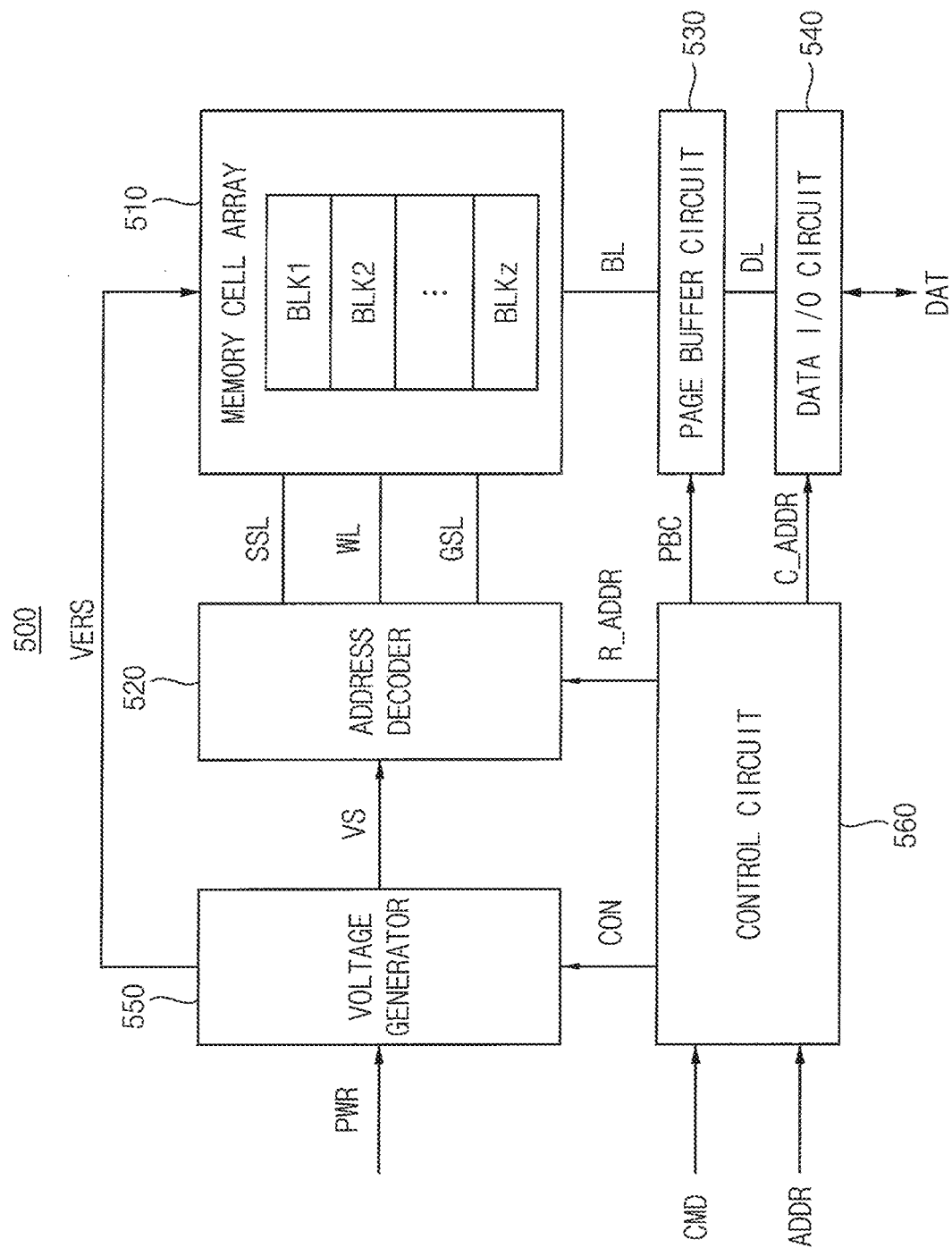
FIG. 5 is a block diagram illustrating an example of a nonvolatile memory included in a storage device according to example embodiments.

FIG. 5 is a block diagram illustrating an example of a nonvolatile memory included in a storage device according to example embodiments.

Referring to FIG. 5, a nonvolatile memory 500 may include a memory cell array 510, an address decoder 520, a page buffer circuit 530, a data I/O circuit 540, a voltage generator 550 and/or a control circuit 560.

The memory cell array 510 may be connected to the address decoder 520 via a plurality of string selection lines SSL, a plurality of wordlines WL and/or a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, ..., BLKz each or one or more of which includes memory cells. In addition, each or one or more of the plurality of memory blocks BLK1, BLK2, ..., BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

In some example embodiments, the plurality of memory cells may include single-level memory cells (SLCs) each or one or more of which stores one data bit, and/or may include multi-level memory cells (MLCs) each or one or more of which stores two or more data bits. Hereinafter, the multi-level memory cell may be used as a term that includes not only a memory cell storing two data bits, but also a memory cell storing three data bits (e.g., a triple level memory cell (TLC)), a memory cell storing four data bits (e.g., a quad level memory cell (QLC)), and/or the like. For example, the multi-level memory cells may be programmed using various program schemes, such as a shadow programming scheme, a reprogramming scheme or an on-chip buffered programming scheme.

The control circuit 560 may receive a command CMD and/or an address ADDR from an outside (e.g., from the storage controller 310 in FIG. 3), and may control erasure, programming and/or read operations of the nonvolatile memory 500 based on the command CMD and/or the address ADDR. An erasure operation may include performing a sequence of erase loops, and a program operation may include performing a sequence of program loops. Each or one or more program loop may include a program operation and/or a program verification operation. Each or one or more erase loop may include an erase operation and/or an erase verification operation. The read operation may include a normal read operation and/or data recover read operation.

For example, the control circuit 560 may generate control signals CON, which are used for controlling the voltage generator 550, and/or may generate control signal PBC for controlling the page buffer circuit 530, based on the command CMD, and/or may generate a row address R_ADDR and/or a column address C_ADDR based on the address ADDR. The control circuit 560 may provide the row address R_ADDR to the address decoder 520 and/or may provide the column address C_ADDR to the data I/O circuit 540.

The address decoder 520 may be connected to the memory cell array 510 via the plurality of string selection lines SSL, the plurality of wordlines WL and/or the plurality of ground selection lines GSL.

For example, in the data erase/write/read operations, the address decoder 520 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/write/read operations, the address decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the address decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may generate voltages VS that are required, or sufficient, for an operation of the nonvolatile memory 500 based on a power PWR and/or the control signals CON. The voltages VS may be applied to the plurality of string selection lines SSL, the plurality of wordlines WL and/or the plurality of ground selection lines GSL via the address decoder 520. In addition, the voltage generator 550 may generate an erase voltage VERS that is required, or sufficient, for the data erase operation based on the power PWR and/or the control signals CON. The erase voltage VERS may be applied to the memory cell array 510 directly and/or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all, or one or more, wordlines of the memory block or a portion of the wordlines via the address decoder 520. In addition, during the erase verification operation, the voltage generator 550 may apply an erase verification voltage simultaneously to all, or one or more, wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each or one or more page buffer may be connected to one bitline. In other example embodiments, each or one or more page buffer may be connected to two or more bitlines.

The page buffer circuit 530 may store data DAT to be programmed into the memory cell array 510 and/or may read data DAT sensed from the memory cell array 510. In other words, the page buffer circuit 530 may operate as a write driver and/or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 and/or may provide the data DAT from the memory cell array 510 to the outside of the nonvolatile memory 500, based on the column address C_ADDR.

Although the nonvolatile memory according to example embodiments is described based on a NAND flash memory, the nonvolatile memory according to example embodiments may be any nonvolatile memory, e.g., a PRAM, a RRAM, a NFGM, a PoRAM, a MRAM, a FRAM, and/or the like.

Figure 6:
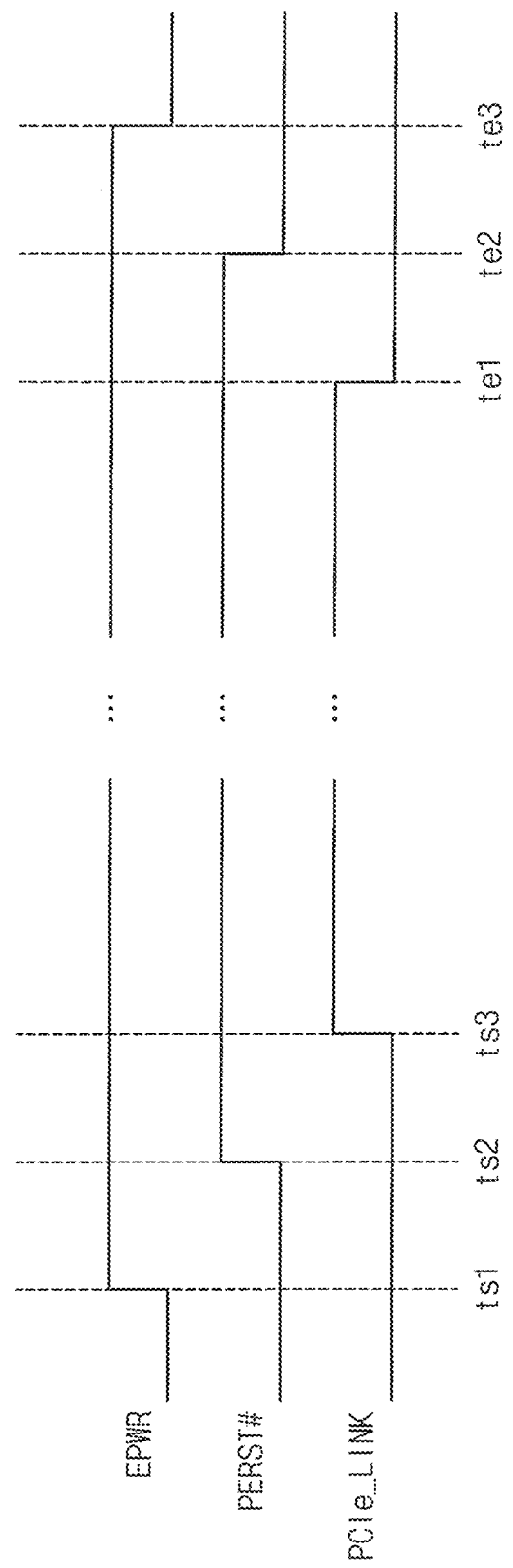
FIG. 6 is a diagram for describing an operation of a storage device according to example embodiments.

FIG. 6 is a diagram for describing an operation of a storage device according to example embodiments.

Referring to FIGS. 3 and 6, an example of the event of interest is illustrated when an interface between the host device 200 and the storage device 300 is formed based on PCIe.

As described with reference to FIG. 3, the storage device 300 may receive the external power supply voltage EPWR from the host device 200, and/or may exchange the plurality of configuration control signals CCON with the host device 200.

In some example embodiments, the plurality of configuration control signals CCON may include a reset signal PERST # and/or a link signal PCIe_LINK. For example, the reset signal PERST # may be a signal provided from the host device 200 to the storage device 300, and may be referred to as a PCIe reset signal. For example, the host device 200 and the storage device 300 may be connected to each other through a physical connection, which is referred to as a link, and may exchange data through the link. The link signal PCIe_LINK may be a signal representing whether such connection between the host device 200 and the storage device 300 through the link is completed, e.g., whether the communication establishment between the host device 200 and the storage controller 310 is completed.

Hereinafter, the event of interest issued in the storage device according to example embodiments will be described with reference to FIG. 6.

In an initial operation time, at a time point ts1, the external power supply voltage EPWR may be activated, and thus power may start to be supplied to the storage device 300 (e.g., to the storage controller 310 in FIG. 3). The time point is 1 may correspond to the power up event, and it may be determined that the power up event is issued by detecting the activation of the external power supply voltage EPWR.

After that, at a time point ts2, the reset signal PERST # may be activated (e.g., de-assertion), and thus the storage controller 310 included in the storage device 300 may be initialized and/or reset. For example, the reset signal PERST # may be used to represent when the power supply is stable and/or is within a predetermined (or alternately given) voltage tolerance, and a status system and/or other logics in the storage controller 310 may be initialized after the power supply is stabilized. The time point ts2 may correspond to the reset event, the reset signal PERST # may be associated with the reset event, and/or it may be determined that the reset event is issued by detecting the activation of the reset signal PERST #.

After that, at a time point ts3, the link signal PCIe_LINK may be activated, and thus the communication establishment between the host device 200 and the storage device 300 (e.g., the storage controller 310) may be completed (e.g., link-up). When the communication establishment is completed, the host device 200 and the storage device 300 (e.g., the storage controller 310) may be in a state in which data can be exchanged. The time point ts3 may correspond to the link up event, and it may be determined that the link up event is issued by detecting the activation of the link signal PCIe_LINK.

After the time points is 1, ts2 and/or ts3 have elapsed, the storage device 300 may normally operate.

After that, at a time point te1, the link signal PCIe_LINK may be deactivated, and thus the communication establishment between the host device 200 and the storage device 300 (e.g., the storage controller 310) may be released, blocked and/or terminated (e.g., link-down). When the communication establishment is released, the host device 200 and the storage device 300 (e.g., the storage controller 310) may be in a state in which data cannot be exchanged. The time point te1 may correspond to the link down event, and it may be determined that the link down event is issued by detecting the deactivation of the link signal PCIe_LINK.

After that, at a time point te2, the reset signal PERST # may be deactivated. After that, at a time point te3, the external power supply voltage EPWR may be deactivated, and thus the power supply to the storage device 300 (e.g., to the storage controller 310) may be blocked. The time point te3 may correspond to the power down event, and it may be determined that the power down event is issued by detecting the deactivation of the external power supply voltage EPWR.

In a personal computer environment, particularly, in a laptop environment, the low power may be an important requirement, or feature, and thus a power management (PM) function may be implemented. Recently, an ultra power saving mode may be requested, and thus a PM operation may become more complicated and related errors may occur frequently. Therefore, as illustrated in FIG. 6, the power up event, the reset event, the link up event, the link down event and/or the power down event by the power cycle and/or the PM operation may be defined as the events of interest according to example embodiments.

Although FIG. 6 illustrates that the external power supply voltage EPWR is deactivated after the link signal PCIe_LINK is deactivated, e.g., the link down event and the power down event are sequentially issued, example embodiments are not limited thereto. For example, the external power supply voltage EPWR may maintain an active state even after the link down event is issued, and then the link up event may be issued again. For another example, in a sudden power off (SPO) situation, the link down event and the power down event may be substantially simultaneously issued.

In some example embodiments, the event of interest may further include the host idle event. There may be a high probability that an unintended error occurs in the host device 200 when the idle state of the host device 200 continues, and thus the debugging log may be generated and stored before a timeout for an I/O command (IO command) of the operating system of the host device 200.

In some example embodiments, the event of interest may further include the thermal event. There may be a high probability that an unintended error occurs in the storage device 300 when the operating temperature of the storage device 300 increases higher than the reference temperature, and thus the debugging log may be generated and stored while the performance of the storage device 300 decreases for reducing the heat generation of the storage device 300. For example, although not illustrated in detail, the storage device 300 may further include a temperature sensor that detects the operating temperature.

In some example embodiments, the event of interest may be predetermined (or alternately given) at a designing phase and/or manufacturing process of the storage device 300. In some example embodiments, the event of interest may be additionally set when the number of errors due to specific operations increases while the storage device 300 is operating.

Figure 7:
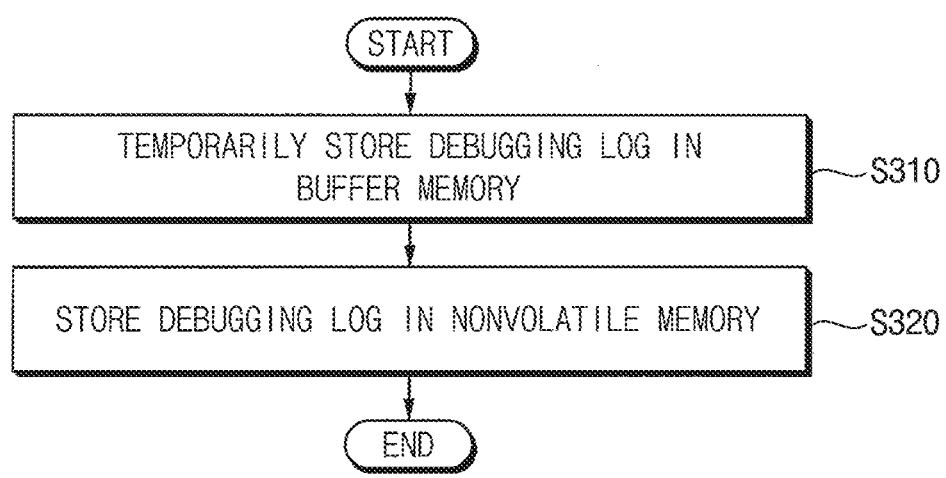
FIG. 7 is a flowchart illustrating an example of storing a debugging log in a nonvolatile memory in FIG. 1.
Figure 8:
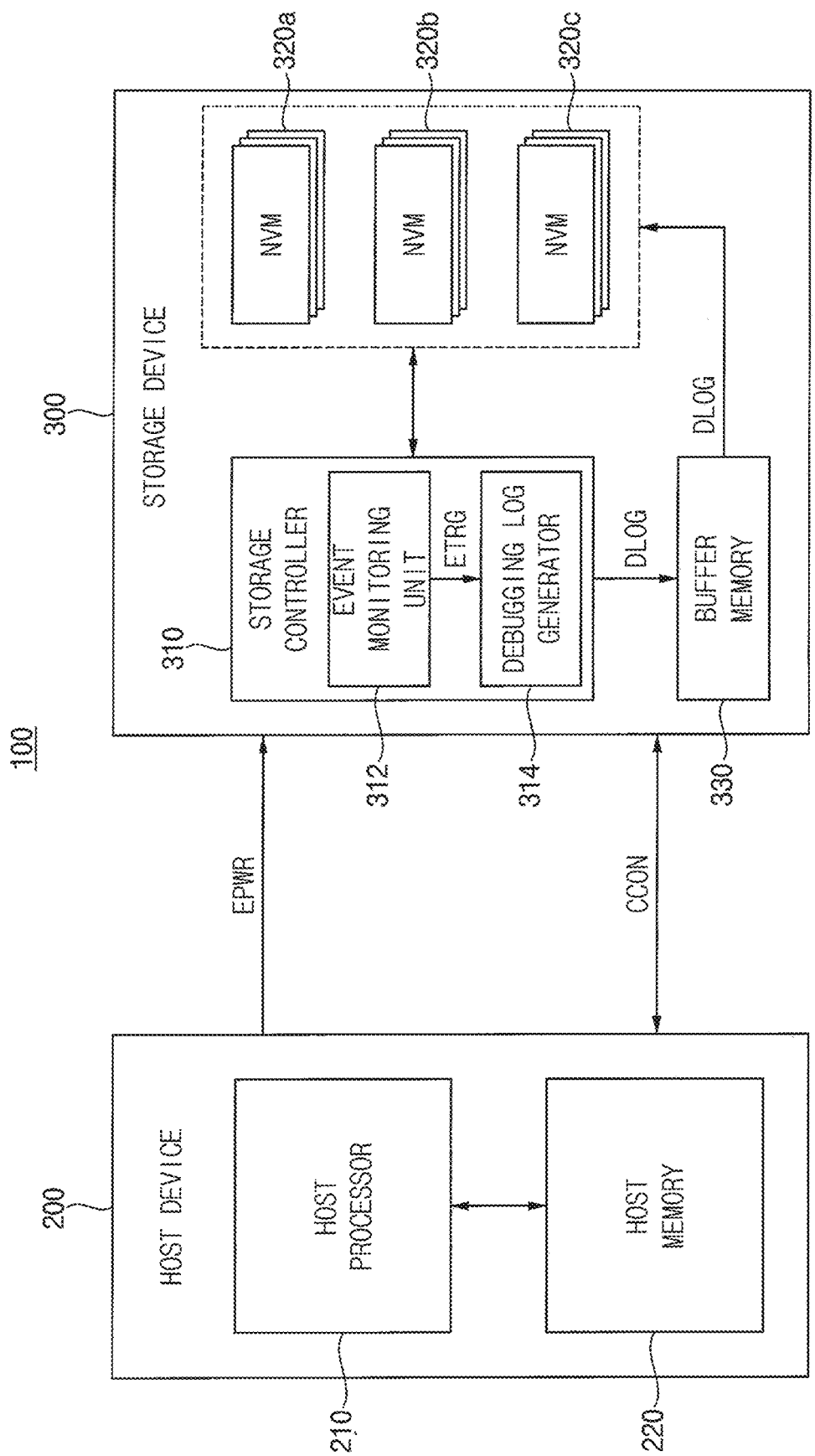
FIG. 8 is a diagram for describing an operation of FIG. 7.

FIG. 7 is a flowchart illustrating an example of storing a debugging log in a nonvolatile memory in FIG. 1. FIG. 8 is a diagram for describing an operation of FIG. 7.

Referring to FIGS. 1, 7 and 8, before step S300 is performed, the storage controller 310 (e.g., the event monitoring unit 312) may generate the event trigger signal ETRG, which is activated when the event of interest is issued. In addition, the storage controller 310 (e.g., the debugging log generator 314) may generate the debugging log DLOG based on the event trigger signal ETRG.

When storing the debugging log in the nonvolatile memory (step S300), the debugging log DLOG may be temporarily stored in the buffer memory 330 by providing the debugging log DLOG that is generated by the storage controller 310 to the buffer memory 330 (step S310). The debugging log DLOG may be stored in the nonvolatile memories 320a, 320b and/or 320c by providing the debugging log DLOG that is temporarily stored in the buffer memory 330 to the nonvolatile memories 320a, 320b and/or 320c (step S320). For example, during a periodic background operation and/or flush operation while the storage device 300 is normally operating, the debugging log DLOG may be transmitted from the buffer memory 330 to the nonvolatile memories 320a, 320b and/or 320c. For example, the debugging log DLOG may be stored in a debugging memory block included in the nonvolatile memories 320a, 320b and/or 320c.

In some example embodiments, the debugging memory block may include multi-level memory cells each or one or more of which stores two or more data bits. When the debugging log DLOG is temporarily stored in the buffer memory 330 and then stored in the nonvolatile memories 320a, 320b and/or 320c as in the example of FIG. 7, the debugging log DLOG may be stored in the debugging memory block including the multi-level memory cells. However, example embodiments are not limited thereto, and the debugging memory block may include single-level memory cells each or one or more of which stores one data bit and/or the debugging log DLOG may be stored in the debugging memory block including the single-level memory cells.

Figure 9:
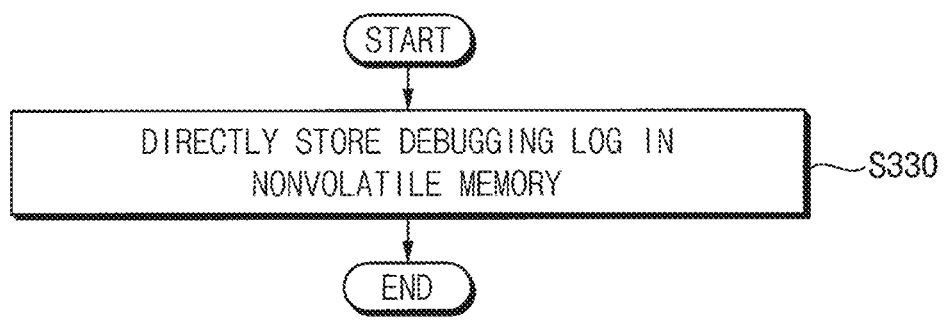
FIG. 9 is a flowchart illustrating another example of storing a debugging log in a nonvolatile memory in FIG. 1.
Figure 10:
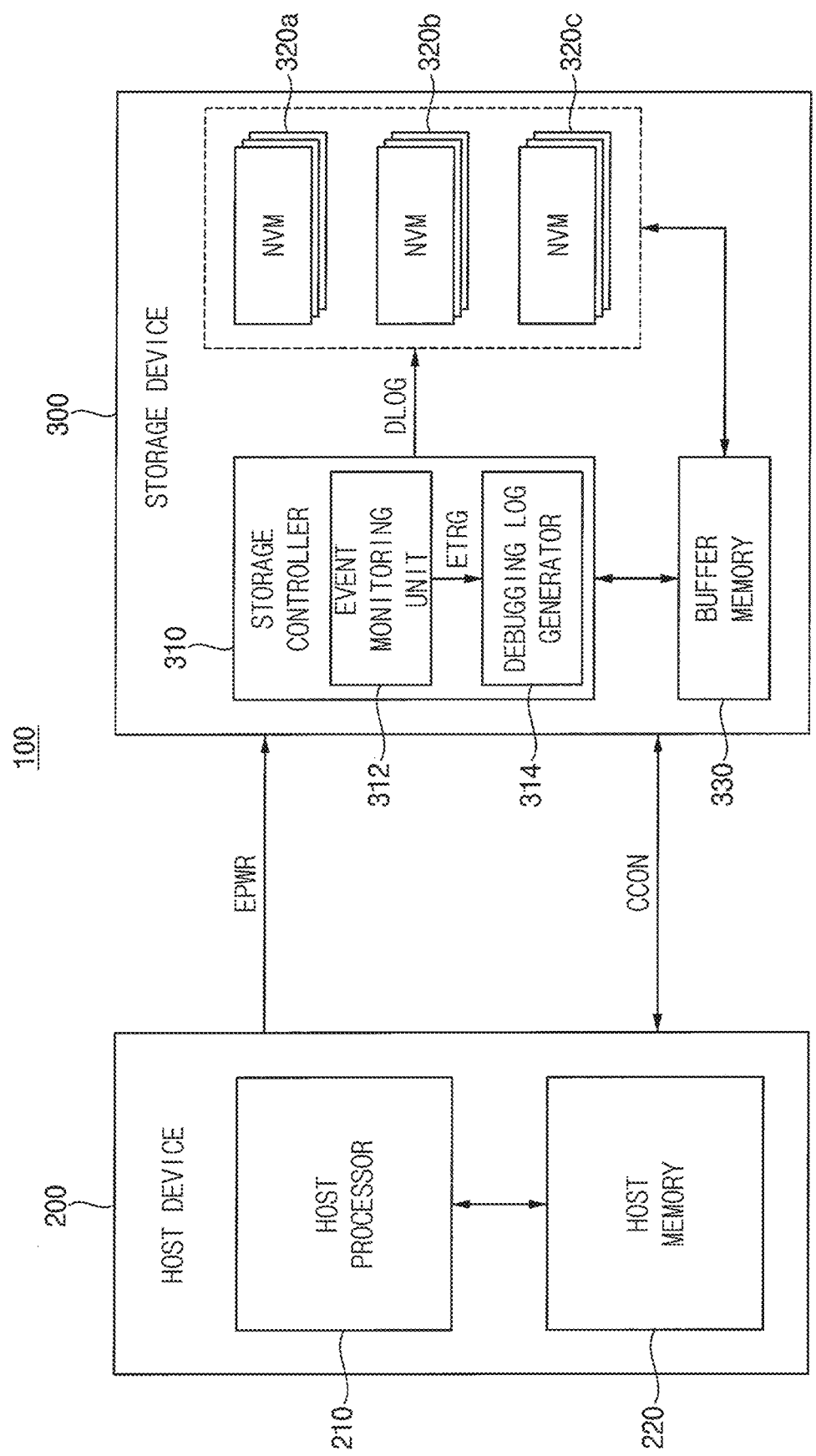
FIG. 10 is a diagram for describing an operation of FIG. 9.

FIG. 9 is a flowchart illustrating another example of storing a debugging log in a nonvolatile memory in FIG. 1. FIG. 10 is a diagram for describing an operation of FIG. 9. The descriptions repeated with FIGS. 7 and 8 will be omitted.

Referring to FIGS. 1, 9 and 10, when storing the debugging log in the nonvolatile memory (step S300), the debugging log DLOG may be directly stored in the nonvolatile memories 320a, 320b and/or 320c by directly providing the debugging log DLOG that is generated by the storage controller 310 to the nonvolatile memories 320a, 320b and/or 320c (step S330). For example, when a sudden power off situation occurs on the storage device 300, the debugging log DLOG may be directly transmitted to the nonvolatile memories 320a, 320b and/or 320c without passing through the buffer memory 330. For example, the debugging log DLOG may be stored in a debugging memory block included in the nonvolatile memories 320a, 320b and/or 320c.

In some example embodiments, the debugging memory block may include single-level memory cells each or one or more of which stores one data bit. When the debugging log DLOG is directly stored in the nonvolatile memories 320a, 320b and/or 320c as in the example of FIG. 9, the debugging log DLOG may be stored in the debugging memory block including the single-level memory cells. However, example embodiments are not limited thereto, and the debugging memory block may include multi-level memory cells each or one or more of which stores two or more data bits and the debugging log DLOG may be stored in the debugging memory block including the multi-level memory cells.

Figure 11:
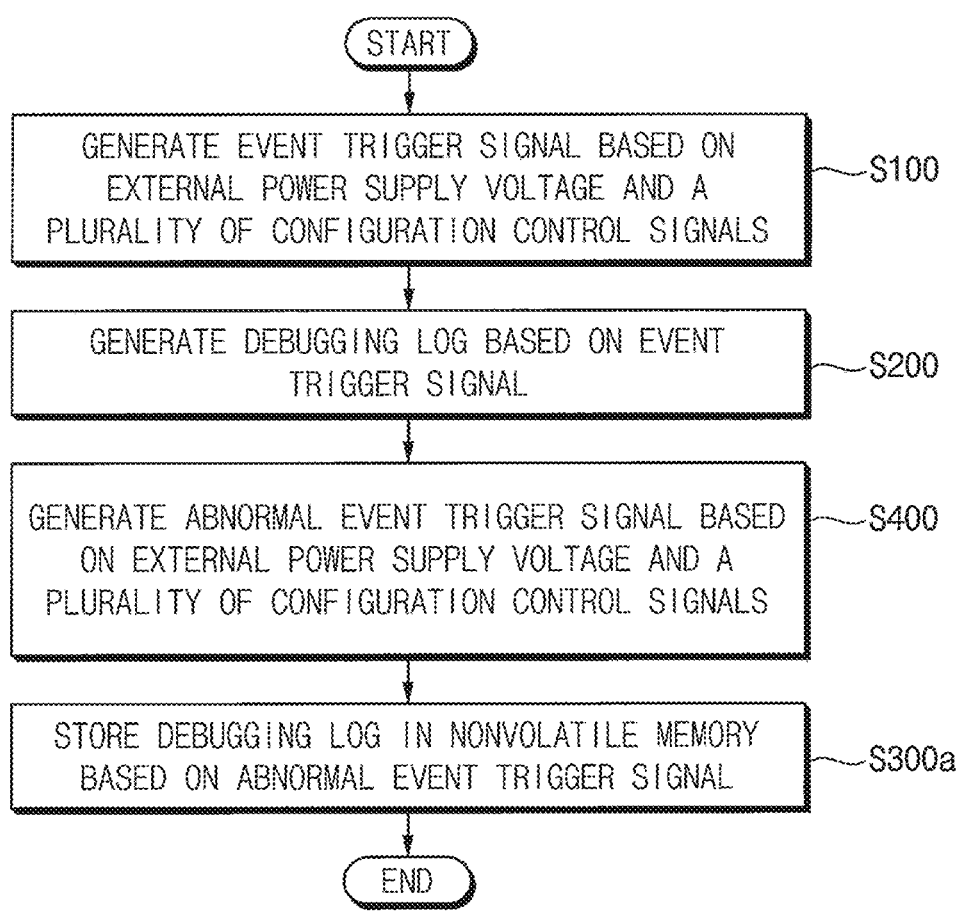
FIG. 11 is a flowchart illustrating a method of managing a debugging log in a storage device according to example embodiments.

FIG. 11 is a flowchart illustrating a method of managing a debugging log in a storage device according to example embodiments. The descriptions repeated with FIG. 1 will be omitted.

Referring to FIG. 11, in a method of managing a debugging log in a storage device according to example embodiments, steps S100 and/or S200 may be substantially the same as steps S100 and S200 in FIG. 1, respectively.

The storage controller generates an abnormal event trigger signal based on the external power supply voltage and the plurality of configuration control signals (step S400). The abnormal event trigger signal is activated when the event of interest corresponds to an abnormal event. For example, as with step S100, the storage controller may monitor whether the event of interest corresponds to the abnormal event, and may activate the abnormal event trigger signal when the event of interest corresponds to the abnormal event.

The debugging log is stored in the nonvolatile memory based on the abnormal event trigger signal (step S300a). Step S300a may be similar to step S300 in FIG. 1, and an operation of storing the debugging log in the nonvolatile memory may be changed depending on whether the abnormal event trigger signal is activated. Step S300a will be described with reference to FIGS. 13 and 14.

Figure 12:
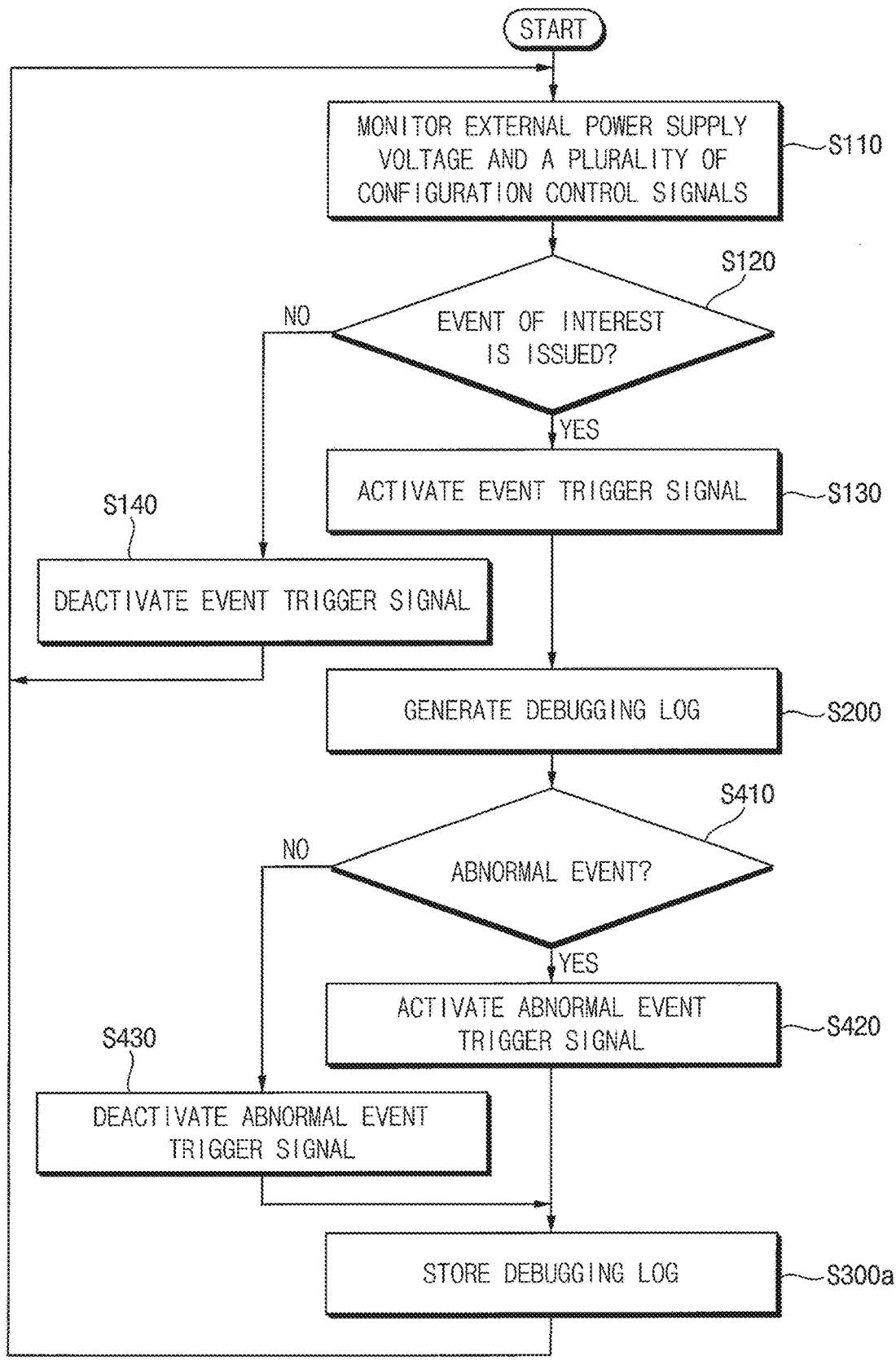
FIG. 12 is a flowchart illustrating an example of a method of managing a debugging log in a storage device of FIG. 11.

FIG. 12 is a flowchart illustrating an example of a method of managing a debugging log in a storage device of FIG. 11. The descriptions repeated with FIG. 2 will be omitted.

Referring to FIGS. 11 and 12, steps S110, S120, S130, S140 and/or S200 may be substantially the same as steps S110, S120, S130, S140 and S200 in FIG. 2, respectively.

When generating the abnormal event trigger signal (step S400), when it is determined, based on the result of the monitoring operation in step S110, that the event of interest corresponds to the abnormal event (step S410: YES), the abnormal event trigger signal may be activated (step S420). For example, as with the event trigger signal, the abnormal event trigger signal may basically have an inactive state, and may temporarily have an active state only when the event of interest corresponds to the abnormal event.

When it is determined, based on the result of the monitoring operation in step S110, that the event of interest does not correspond to the abnormal event (step S410: NO), e.g., when it is determined that the event of interest corresponds to a normal event, the abnormal event trigger signal may be deactivated (step S430). For example, the inactive state of the abnormal event trigger signal may be maintained.

The debugging log may be stored in the nonvolatile memory based on the abnormal event trigger signal that is activated or deactivated (step S300a). After step S300a is performed, the activated event trigger signal and/or the activated abnormal event trigger signal may be deactivated.

Figure 13:
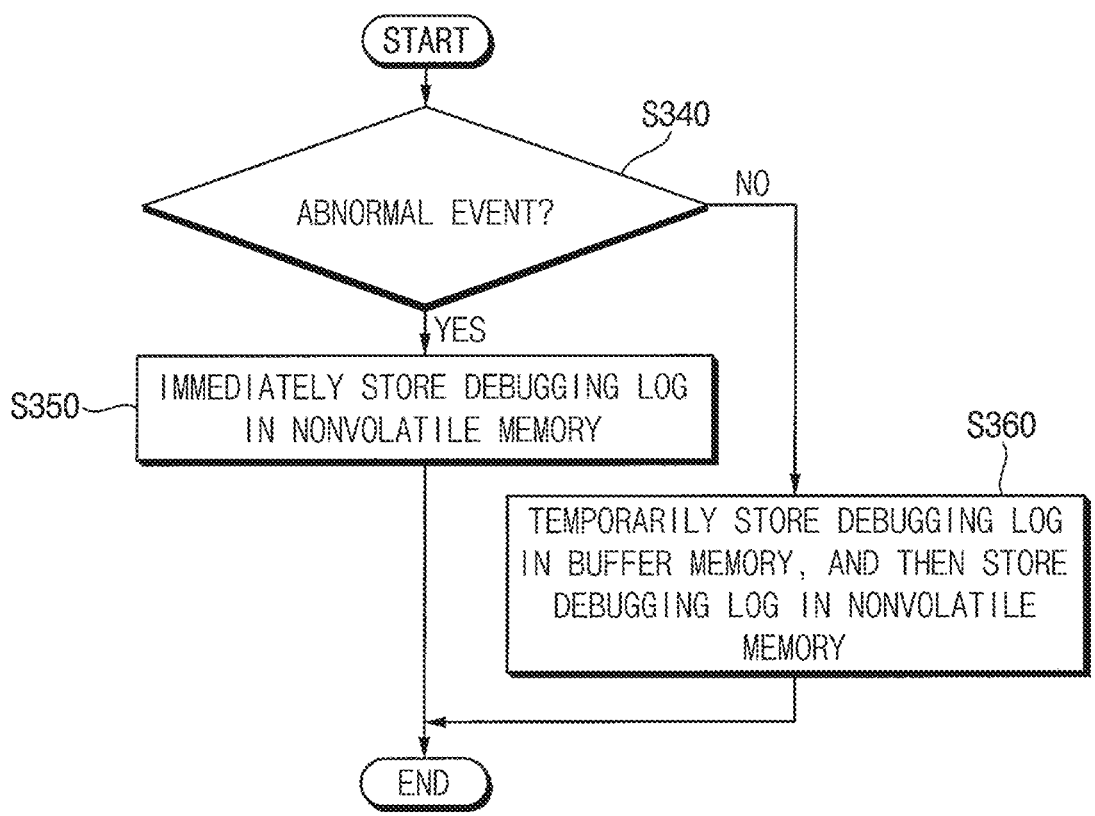
FIG. 13 is a flowchart illustrating an example of storing a debugging log in a nonvolatile memory in FIG. 11.
Figure 14:
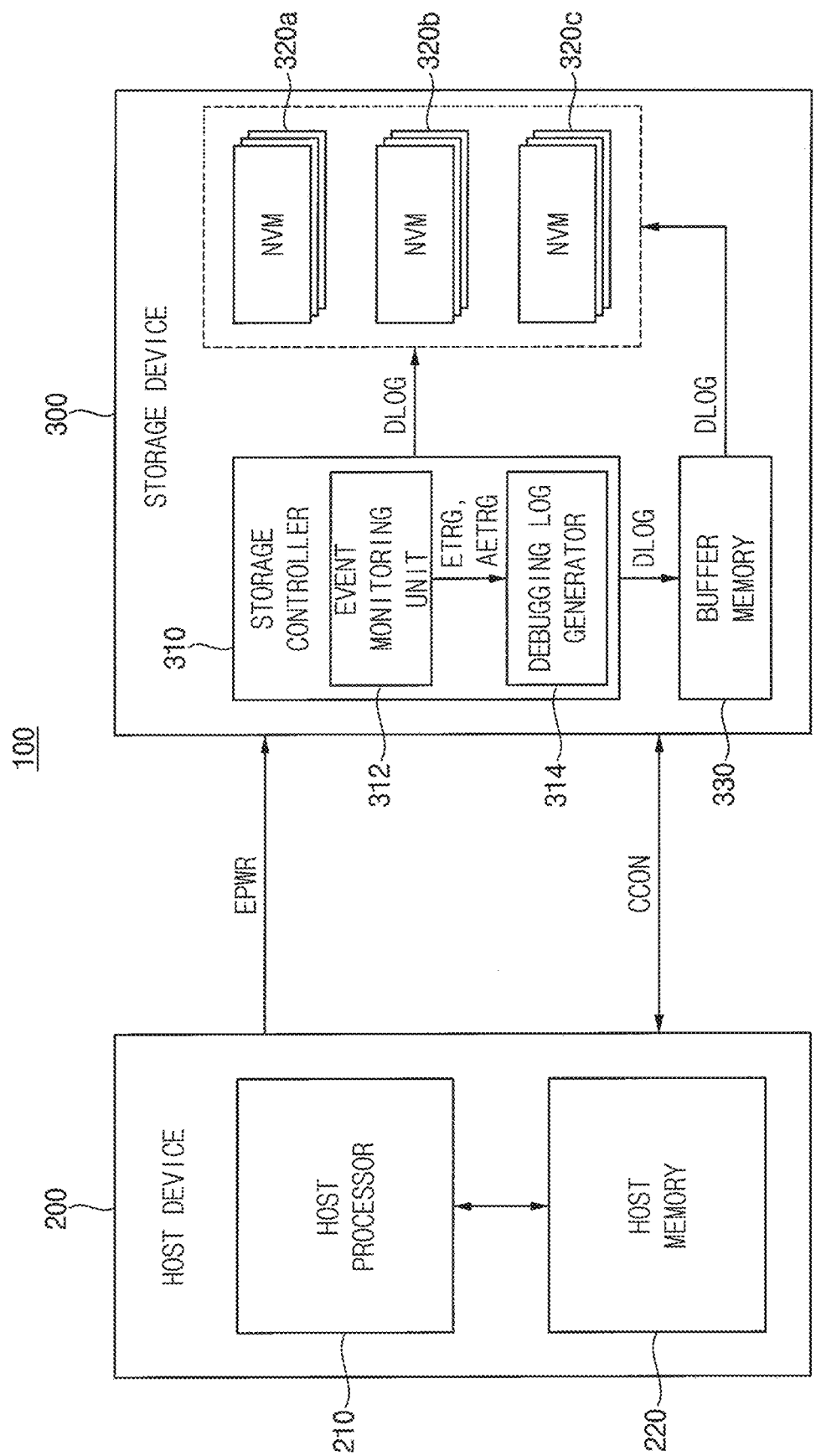
FIG. 14 is a diagram for describing an operation of FIG. 13.

FIG. 13 is a flowchart illustrating an example of storing a debugging log in a nonvolatile memory in FIG. 11. FIG. 14 is a diagram for describing an operation of FIG. 13. The descriptions repeated with FIGS. 7, 8, 9 and 10 will be omitted.

Referring to FIGS. 11, 13 and 14, before step S300a is performed, the storage controller 310 (e.g., the event monitoring unit 312) may generate the event trigger signal ETRG, which is activated when the event of interest is issued, and may generate an abnormal event trigger signal AETRG, which is activated when the event of interest corresponds to the abnormal event. In addition, the storage controller 310 (e.g., the debugging log generator 314) may generate the debugging log DLOG based on the event trigger signal ETRG.

When storing the debugging log in the nonvolatile memory based on the abnormal event trigger signal (step S300a), step S340 may be substantially the same as step S410 in FIG. 12, and step S340 may be omitted when step S410 in FIG. 12 is performed.

When it is determined that the event of interest corresponds to the abnormal event (step S410: YES), e.g., when the abnormal event trigger signal AETRG is activated, the storage controller 310 may immediately store the debugging log DLOG in the nonvolatile memories 320a, 320b and/or 320c based on the abnormal event trigger signal AETRG (step S350). In other words, when it is determined that the abnormal event is issued, the debugging log DLOG may be immediately updated to the nonvolatile memories 320a, 320b and/or 320c to reduce or prevent the loss of the debugging log DLOG. For example, as described with reference to FIG. 9, the debugging log DLOG may be directly provided to the nonvolatile memories 320a, 320b and/or 320c. For another example, as described with reference to FIG. 7, the debugging log DLOG may be provided to the nonvolatile memories 320a, 320b and 320c through the buffer memory 330.

When it is determined that the event of interest corresponds to the normal event (step S410: NO), e.g., when the abnormal event trigger signal AETRG is deactivated, the debugging log DLOG may be temporarily stored in the buffer memory 330 and then may be stored in the nonvolatile memories 320a, 320b and/or 320c (step S360). In other words, when it is determined that the normal event is issued, the debugging log DLOG may be updated to the nonvolatile memories 320a, 320b and/or 320c only at a predetermined (or alternately given) update timing, and thus the performance degradation and wear-out of the nonvolatile memories 320a, 320b and/or 320c due to the frequent updates may be reduced or prevented. For example, step S360 may include steps S310 and/or S320 in FIG. 7.

Figure 15:
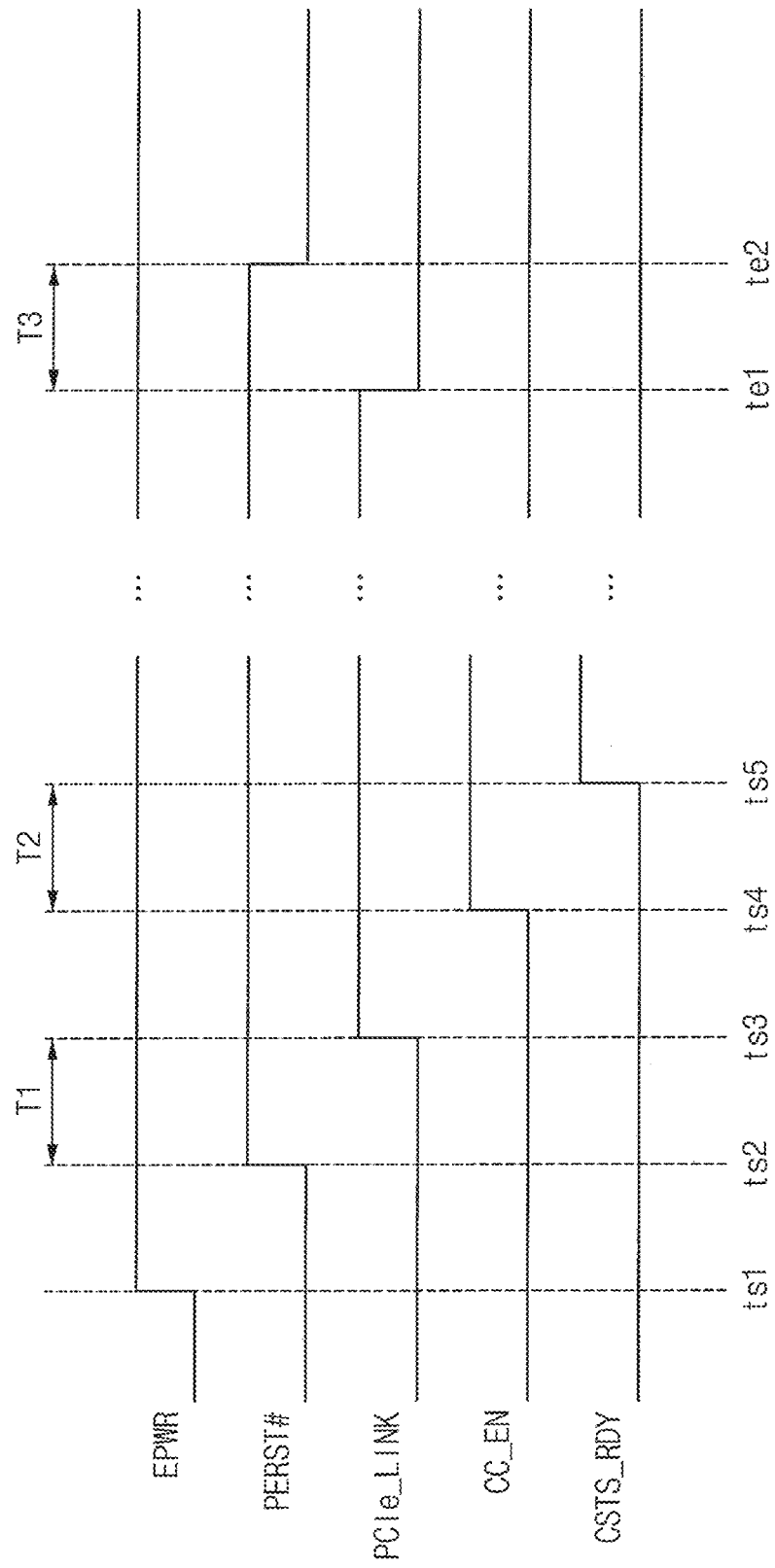
FIG. 15 is a diagram for describing an operation of a storage device according to example embodiments.

FIG. 15 is a diagram for describing an operation of a storage device according to example embodiments. The descriptions repeated with FIG. 6 will be omitted.

Referring to FIGS. 14 and 15, an example of the event of interest and an example of determining whether the event of interest corresponds to the abnormal event are illustrated when an interface between the host device 200 and the storage device 300 is formed based on PCIe.

In some example embodiments, the plurality of configuration control signals CCON may include the reset signal PERST # and the link signal PCIe_LINK, and may further include a controller configuration enable signal CC_EN and a controller status ready signal CSTS_RDY. For example, the controller configuration enable signal CC_EN may be a signal provided from the host device 200 to the storage device 300, and may represent the setting completion for the storage controller 310. For example, the controller status ready signal CSTS_RDY may be a signal provided from the storage device 300 to the host device 200, and may represent the preparation completion of the storage controller 310.

Hereinafter, the operation of determining whether the event of interest issued in the storage device according to example embodiments corresponds to the abnormal event will be described with reference to FIG. 15.

The time points ts1, ts2, ts3, te1 and te2 may be substantially the same as those described with reference to FIG. 6. At a time point ts4, the host device 200 may activate the controller configuration enable signal CC_EN. At a time point ts5, the storage controller 310 may activate the controller status ready signal CSTS_RDY.

In some example embodiments, when a time interval T1 between a first time point ts2 and a second time point ts3 is greater than a predetermined (or alternately given) first reference value, it may be determined that the event of interest corresponds to the abnormal event. The first time point ts2 may represent a time point at which the reset signal PERST # is activated, and the second time point ts3 may represent a time point at which the communication establishment between the host device 200 and the storage device 300 (e.g., the storage controller 310) is completed. For example, the host device 200 may perform a reset release, and then the storage device 300 may enable a link training and status state machine (LTSSM) and may perform a linkup. Thus, a time interval (e.g., the time interval T1) required, or sufficient, from the reset release to the link up may be checked, and it may be determined that the abnormal event is issued when the time interval T1 is greater than the first reference value. For example, the debugging log DLOG may include information associated with the LTSSM.

In some example embodiments, when a time interval T2 between a third time point ts4 and a fourth time point ts5 is greater than a predetermined (or alternately given) second reference value, it may be determined that the event of interest corresponds to the abnormal event. The third time point ts4 may represent a time point at which the controller configuration enable signal CC_EN is activated, and the fourth time point ts5 may represent a time point at which the controller status ready signal CSTS_RDY is activated.

In some example embodiments, when a time interval T3 between a fifth time point te1 and a sixth time point te2 is greater than a predetermined (or alternately given) third reference value, it may be determined that the event of interest corresponds to the abnormal event. The fifth time point te1 may represent a time point at which the communication establishment between the host device 200 and the storage device 300 (e.g., the storage controller 310) is released, and the sixth time point te2 may represent a time point at which the reset signal PERST # is deactivated.

However, example embodiments are not limited thereto. For example, the abnormal event may further include a case in which the power up and/or the reset are not completed within a predetermined (or alternately given) time interval, a case in which an abnormal link up and/or an abnormal link down occur, a case in which the idle state of the host device 200 continues for more than the reference time interval, a case in which the operating temperature of the storage device 300 is maintained higher than the reference temperature for more than a predetermined (or alternately given) time interval after the operating temperature increases higher than the reference temperature, etc.

Figure 16:
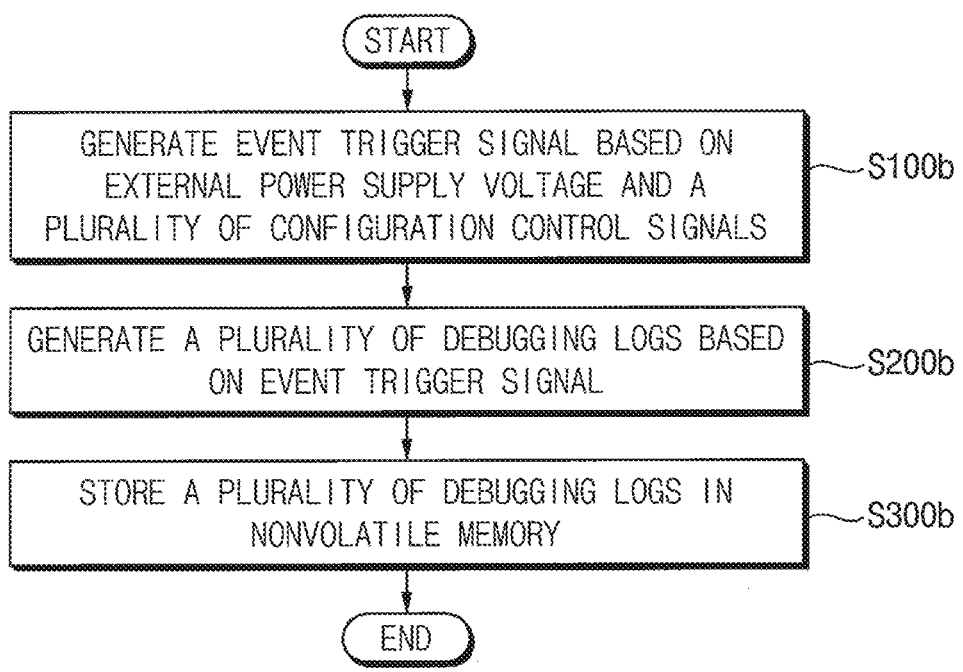
FIG. 16 is a flowchart illustrating a method of managing a debugging log in a storage device according to example embodiments.

FIG. 16 is a flowchart illustrating a method of managing a debugging log in a storage device according to example embodiments. The descriptions repeated with FIG. 1 will be omitted.

Referring to FIG. 16, in a method of managing a debugging log in a storage device according to example embodiments, the storage controller generates the event trigger signal based on the external power supply voltage and/or the plurality of configuration control signals (step S100b). The event trigger signal is activated when a plurality of events of interest are issued for generating and/or storing a plurality of debugging logs. The storage controller generates the plurality of debugging logs based on the event trigger signal (step S200b). The plurality of debugging logs are stored in the nonvolatile memory (step S300b). For example, when the plurality of events of interest are sequentially issued, the plurality of debugging logs corresponding thereto may be sequentially generated and/or stored.

Steps S100b, S200b and/or S300b may be similar to steps S100, S200 and S300 in FIG. 1, respectively. The example of FIG. 16 may be substantially the same as the example of FIG. 1, except that the plurality of events of interest are issued and the plurality of debugging logs are generated and/or stored. In the example of FIG. 16, an operation of generating and/or storing one debugging log based on the event trigger signal when one event of interest is issued may be substantially the same as that described with reference to FIG. 1. In addition, an operation of detecting the plurality of events of interest and/or an operation of generating and/or storing the plurality of debugging logs may be implemented by continuously and/or repeatedly performing the monitoring operation as described with reference to FIG. 2.

In some example embodiments, as described with reference to FIG. 11, an operation of generating the abnormal event trigger signal, which is activated when the plurality of events of interest correspond to the abnormal event, may be added to the example of FIG. 16. In this example, an operation of determining whether one event of interest corresponds to the abnormal event may be substantially the same as that described with reference to FIGS. 11 and 12.

Figure 17:
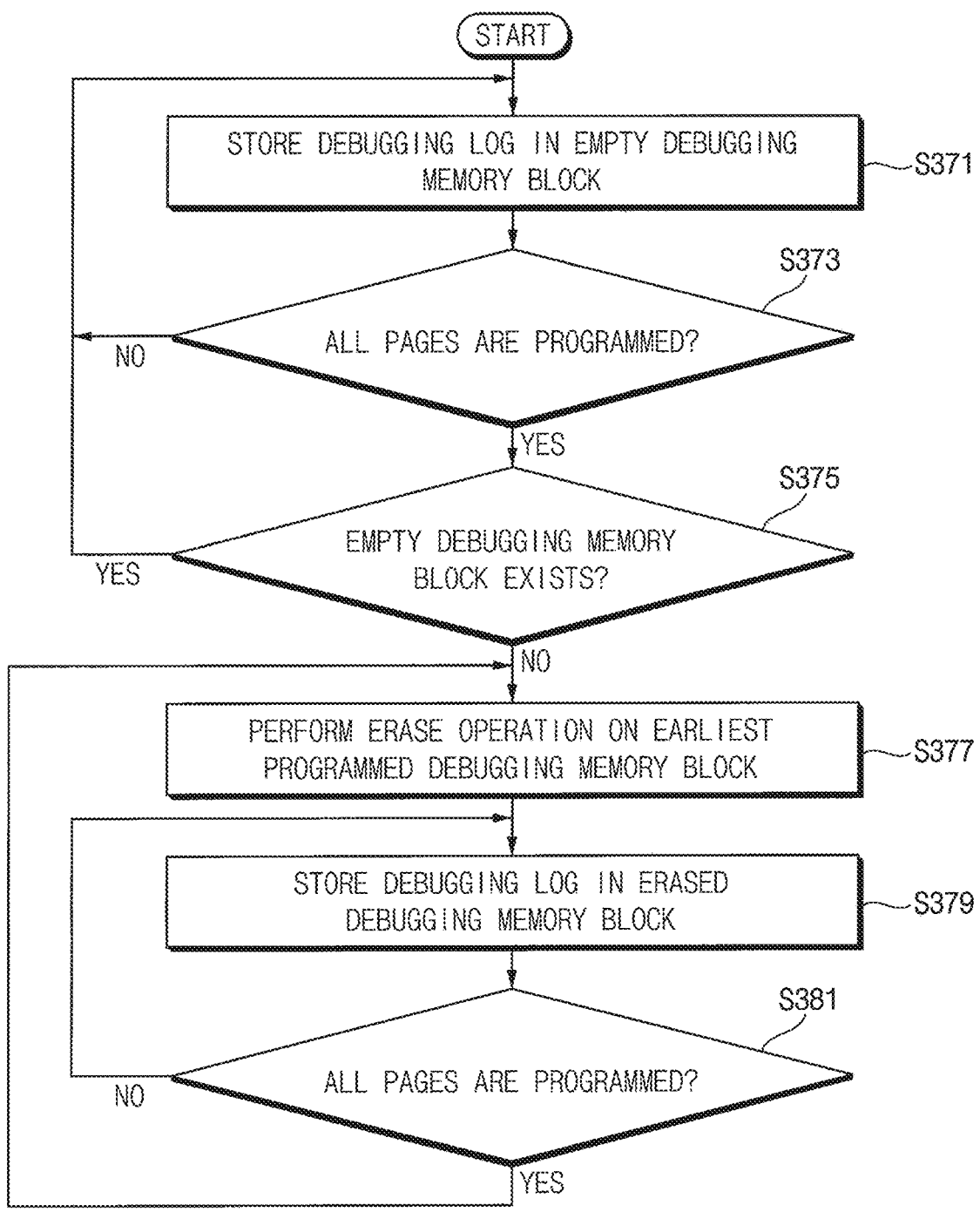
FIG. 17 is a flowchart illustrating an example of storing a plurality of debugging logs in a nonvolatile memory in FIG. 16.

FIG. 17 is a flowchart illustrating an example of storing a plurality of debugging logs in a nonvolatile memory in FIG. 16.

Referring to FIGS. 16 and 17, when storing the plurality of debugging logs in the nonvolatile memory (step S300b), the nonvolatile memory may include a plurality of memory blocks, as described with reference to FIG. 5. In addition, two or more of the plurality of memory blocks may be set as a debugging memory block that stores the plurality of debugging logs, and the plurality of debugging logs may be sequentially stored in two or more debugging memory blocks.

In an initial operation time, all, or one or more, of the debugging memory blocks may be empty. Thus, one empty debugging memory block may be selected, and some of the plurality of debugging logs may be sequentially stored in the selected debugging memory block (step S371).

When all pages of the selected debugging memory block are not programmed (step S373: NO), step S371 may be performed on the selected debugging memory block until all pages of the selected debugging memory block are programmed.

When all pages of the selected debugging memory block are programmed (step S373: YES), and when at least one another empty debugging memory block exists (step S375: YES), another empty debugging memory block may be selected, and steps S371 and S373 may be performed on the selected debugging memory block.

When all the debugging memory blocks are used and there is no empty debugging memory block (step S375: NO), the debugging memory block that is earliest (or oldest) programmed (e.g., the debugging memory block firstly selected in step S371) may be selected, and an erase operation is performed on the selected debugging memory block (step S377). Some of the plurality of debugging logs may be sequentially stored in the erased debugging memory block (step S379). Step S379 may be substantially the same as step S371.

When all pages of the erased debugging memory block are not programmed (step S381: NO), step S379 may be performed on the erased debugging memory block until all pages of the erased debugging memory block are programmed Step S381 may be substantially the same as step S373.

When all pages of the erased debugging memory block are programmed (step S381: YES), the debugging memory block that is earliest programmed at a current time point may be selected, and steps S377, S379 and S381 may be performed on the selected debugging memory block.

When only one debugging memory block is used, the debugging log that is actually necessary may be lost if it is stored in the last page, because of the characteristics of the erase operation of the NAND flash memory in which the erase operation is performed by units of memory block. In contrast, when two or more debugging memory blocks are assigned or allocated as described above, the loss of the debugging log that is actually necessary may be reduced or prevented. Accordingly, a debugging technique according to example embodiments may more accurately determine and/or correct errors in a storage device, and integrity of data stored on the storage device may be more effectively maintained.

FIGS. 18A, 18B, 18C, 18D and 18E are diagrams for describing an operation of FIG. 17.

Referring to FIGS. 18A, 18B, 18C, 18D and 18E, an example in which two debugging memory blocks BLK1 and BLK2 are used is illustrated. The debugging memory blocks BLK1 and/or BLK2 may be included in the nonvolatile memories 320*a*, 320*b* and/or 320*c*.

Figure 18A:
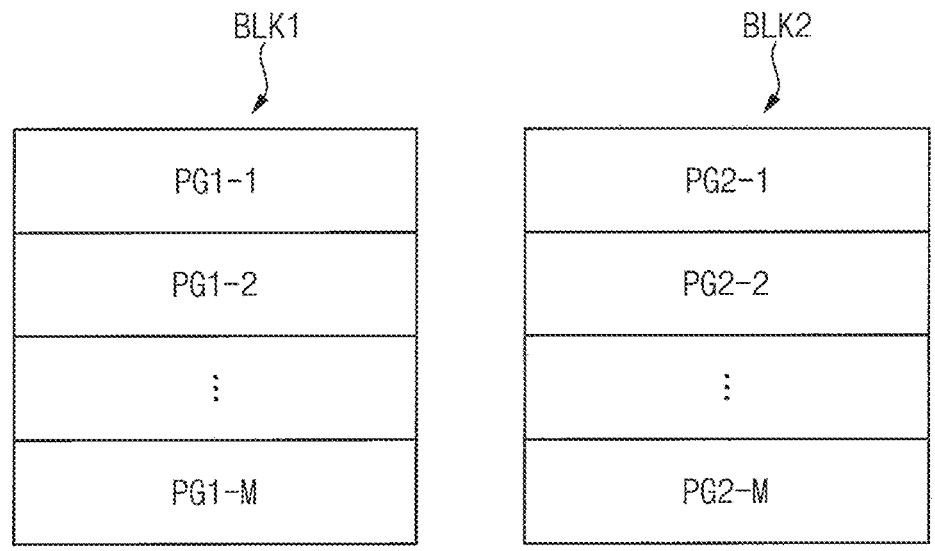
FIGS. 18A, 18B, 18C, 18D and 18E are diagrams for describing an operation of FIG. 17.

As illustrated in FIG. 18A, the first debugging memory block BLK1 may include M pages PG1-1, PG1-2, . . . , PG1-M, where M is a natural number greater than or equal to two, and the second debugging memory block BLK2 may also include M pages PG2-1, PG2-2, . . . , PG2-M. In an initial operation time, both the first and second debugging memory blocks BLK1 and BLK2 may not store debugging logs and may be empty.

Figure 18B:
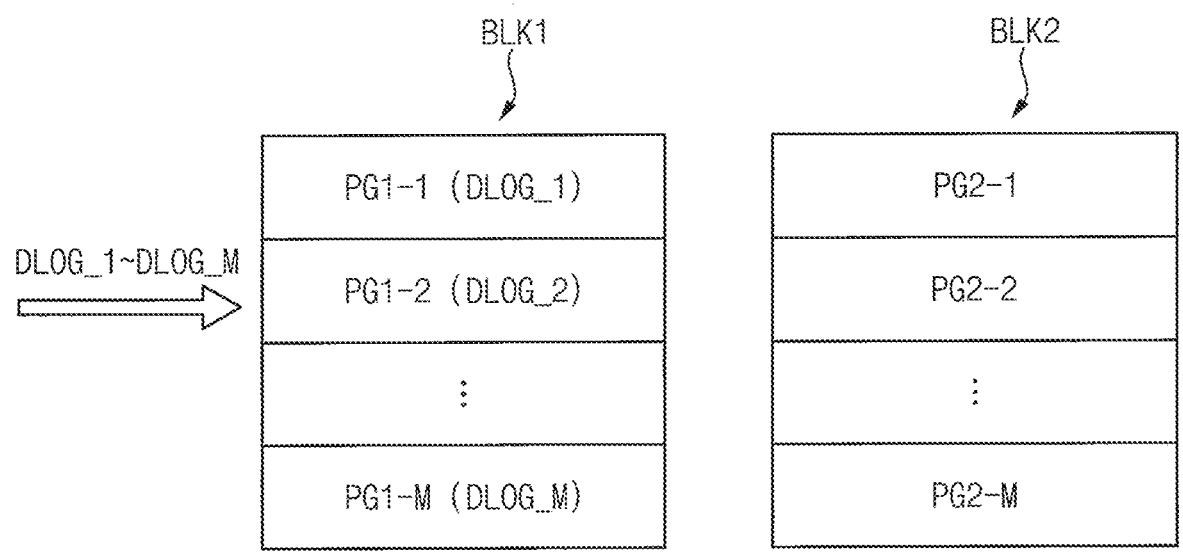

As illustrated in FIG. 18B, first to M-th events of interest may be sequentially issued, and first to M-th debugging logs DLOG_1 to DLOG_M may be sequentially generated and provided to the nonvolatile memories 320*a*, 320*b* and 320*c*. The first debugging memory block BLK1 may be selected from among the first and second debugging memory blocks BLK1 and BLK2 that are empty, and the first to M-th debugging logs DLOG_1 to DLOG_M may be sequentially stored in the pages PG1-1 to PG1-M included in the first debugging memory block BLK1. Although FIG. 18 and subsequent figures illustrate that one debugging log is stored in one page, example embodiments are not limited thereto. When up to the M-th debugging log DLOG_M is stored, all pages PG1-1 to PG1-M in the first debugging memory block BLK1 may be programmed.

Figure 18C:
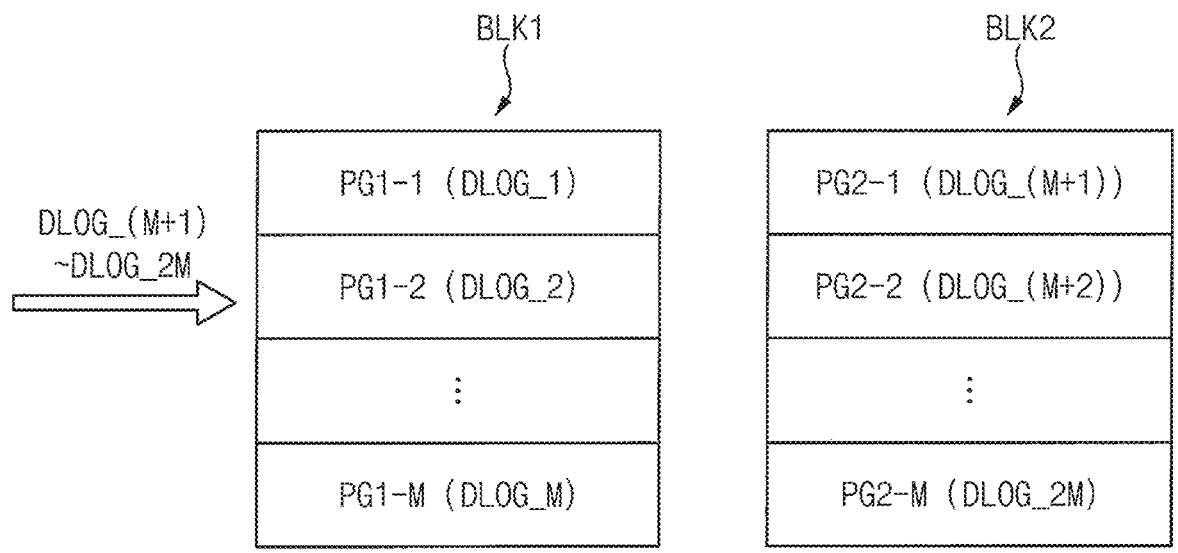

After that, as illustrated in FIG. 18C, (M+1)-th to 2M-th events of interest may be sequentially issued, and (M+1)-th to 2M-th debugging logs DLOG_(M+1) to DLOG_2M may be sequentially generated and provided to the nonvolatile memories 320*a*, 320*b* and/or 320*c*. The second debugging memory block BLK2 that is empty may be selected, and the (M+1)-th to 2M-th debugging logs DLOG_(M+1) to DLOG_2M may be sequentially stored in the pages PG2-1 to PG2-M included in the second debugging memory block BLK2. When up to the 2M-th debugging log DLOG_2M is stored, all pages PG2-1 to PG2-M in the second debugging memory block BLK2 may be programmed.

Figure 18D:
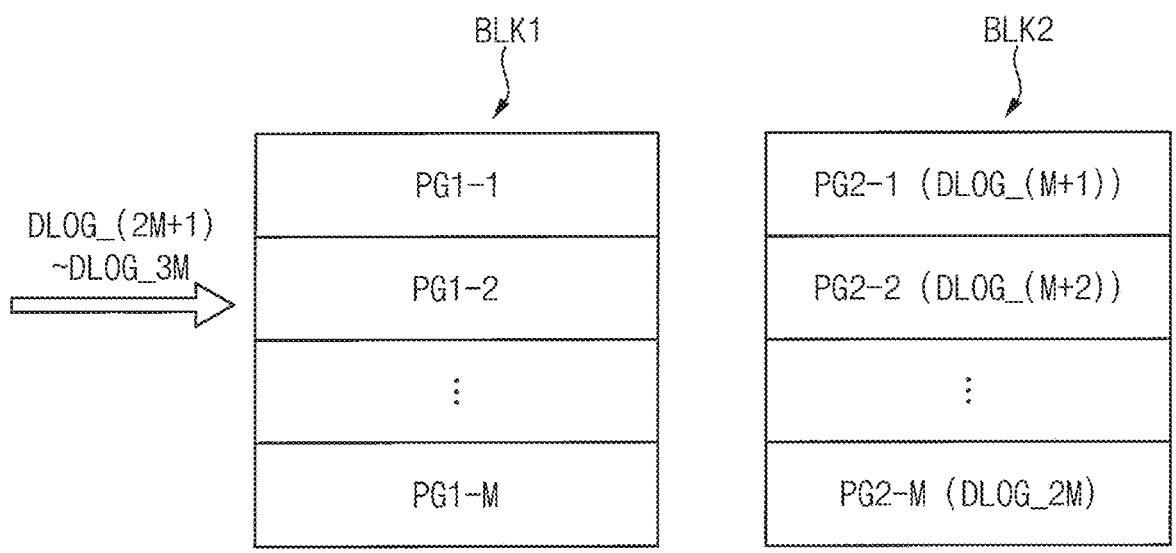

After that, as illustrated in FIG. 18D, (2M+1)-th to 3M-th events of interest may be sequentially issued, and (2M+1)-th to 3M-th debugging logs DLOG_(2M+1) to DLOG_3M may be sequentially generated and provided to the nonvolatile memories 320*a*, 320*b* and/or 320*c*. Since there is no empty debugging memory block, the first debugging memory block BLK1 that is programmed earlier may be selected from among the first and second debugging memory blocks BLK1 and BLK2, and the erase operation may be performed on the first debugging memory block BLK1.

Figure 18E:
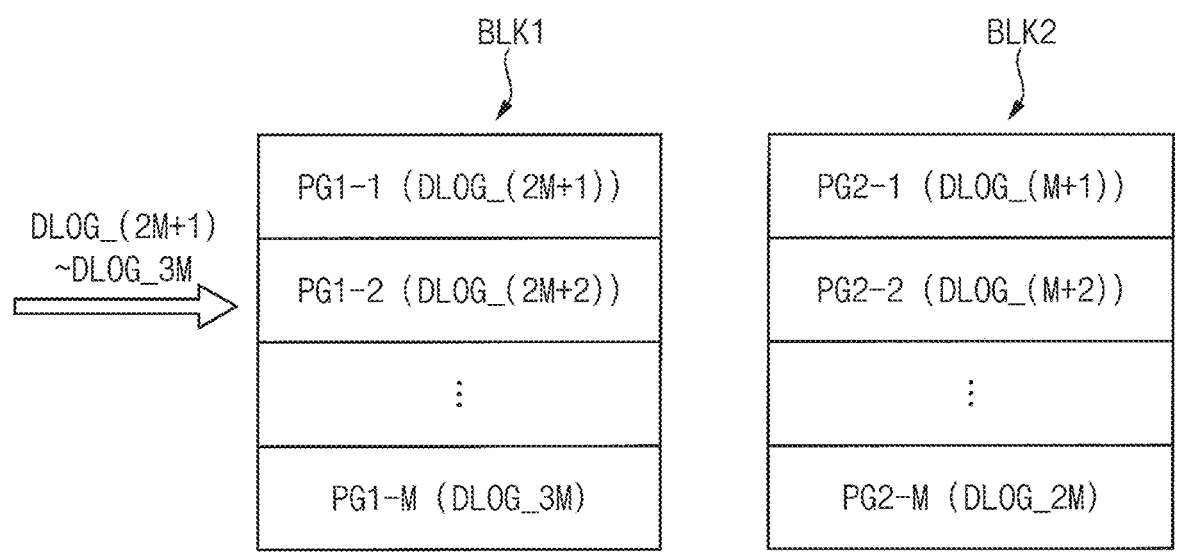

After that, as illustrated in FIG. 18E, the (2M+1) to 3M debugging logs DLOG_(2M+1) to DLOG_3M may be sequentially stored in the pages PG1-1 to PG1-M included the first debugging memory block BLK1 that is erased.

When only one debugging memory block is used, and when up to the (2M+1)-th debugging log DLOG_(2M+1) is stored but the 2M-th debugging log DLOG_2M is necessary, the 2M-th debugging log DLOG_2M may be lost due to the erase operation and may not be obtained. In contrast, when two (or more) debugging memory blocks BLK1 and BLK2 are used as described above, the 2M-th debugging log DLOG_2M may be obtained from the second debugging memory block BLK2 that is not erased yet.

Figure 19:
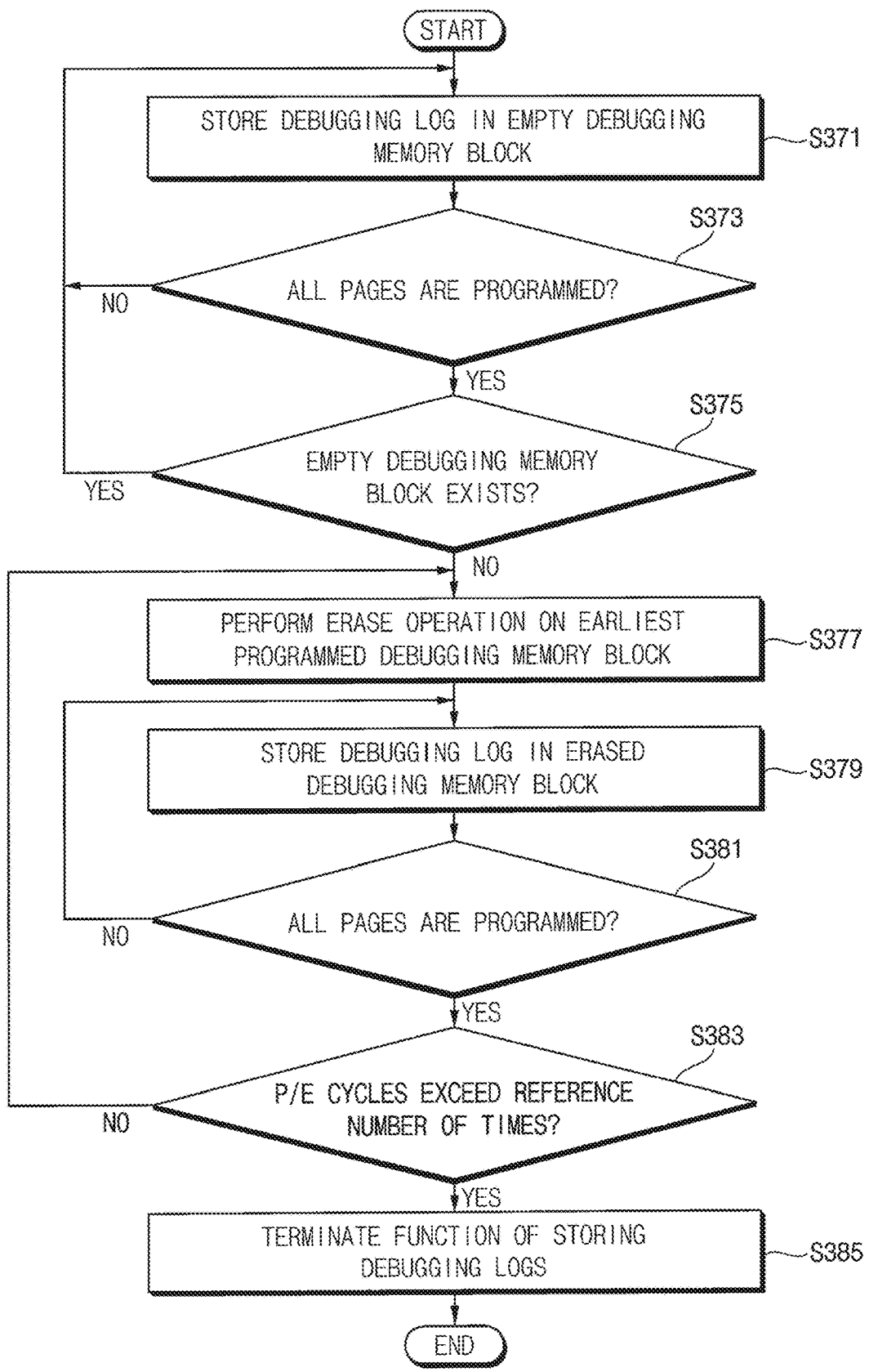
FIG. 19 is a flowchart illustrating another example of storing a plurality of debugging logs in a nonvolatile memory in FIG. 16.

FIG. 19 is a flowchart illustrating another example of storing a plurality of debugging logs in a nonvolatile memory in FIG. 16. The descriptions repeated with FIG. 17 will be omitted.

Referring to FIGS. 16 and 19, when storing the plurality of debugging logs in the nonvolatile memory (step S300*b*), steps S371, S373, S375, S377, S379 and/or S381 may be substantially the same as steps S371, S373, S375, S377, S379 and S381 in FIG. 17, respectively.

When all pages of the erased debugging memory block are programmed (step S381: YES), it may be determined whether program/erase (P/E) cycles of all the debugging memory blocks exceed a predetermined (or alternately given) reference number of times (step S383), before the debugging memory block that is earliest programmed at the current time point is selected and steps S377, S379 and/or S381 are performed.

When the P/E cycles of all the debugging memory blocks exceed the reference number of times (step S383: YES), it may represent that the lifetime of all the debugging memory blocks is over and the operation of storing the debugging logs is impossible, and thus a function of storing the debugging logs may be terminated or finished (step S385). In other words, when all the debugging memory blocks are out of the warranty even if two or more debugging memory blocks are used to reduce or prevent the loss of the debugging log, a debuggability function may be turned off.

When the P/E cycle of at least one debugging memory block is within the reference number of times (step S383: NO), the debugging memory block that is within the warranty and is earliest programmed at the current time point may be selected, and steps S377, S379 and/or S381 may be performed on the selected debugging memory block.

Figure 20:
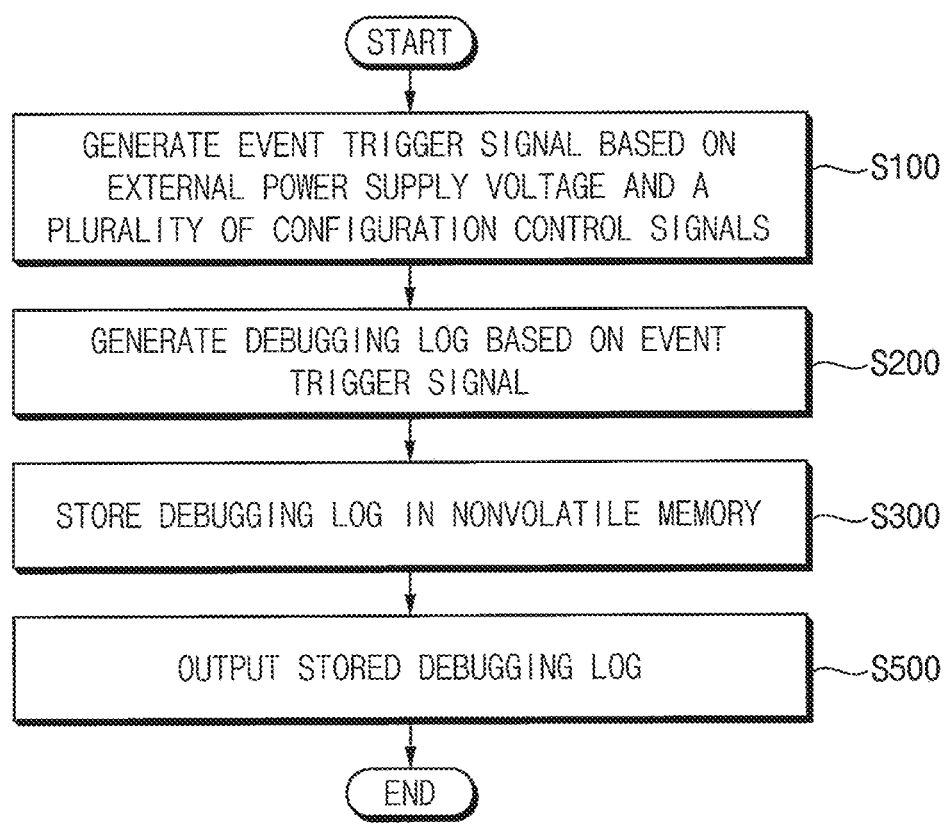
FIG. 20 is a flowchart illustrating a method of managing a debugging log in a storage device according to example embodiments.

FIG. 20 is a flowchart illustrating a method of managing a debugging log in a storage device according to example embodiments. The descriptions repeated with FIG. 1 will be omitted.

Referring to FIG. 20, in a method of managing a debugging log in a storage device according to example embodiments, steps S100, S200 and/or S300 may be substantially the same as steps S100, S200 and S300 in FIG. 1, respectively.

The debugging log stored in the nonvolatile memory is output (step S500). For example, the debugging log may be output to the host device and may be provided to a host memory (e.g., the host memory 220 in FIG. 3) included in the host device, based on a request from the host device. For another example, the storage device may be physically connected to a debugging device disposed outside the storage system through a separate port, and/or the debugging log may be output to the debugging device based on a request (e.g., a vendor unit command) from the debugging device. The host device and/or the debugging device may analyze the errors occurring in the storage device based on the debugging log.

As will be appreciated by those skilled in the art, the inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, and/or other programmable data processing apparatus. The computer readable medium may be a computer readable signal medium and/or a computer readable storage medium. The computer readable storage medium may be any tangible medium that can contain and/or store a program for use by and/or in connection with an instruction execution system, apparatus, and/or device. For example, the computer readable medium may be a non-transitory computer readable medium.

Figure 21:
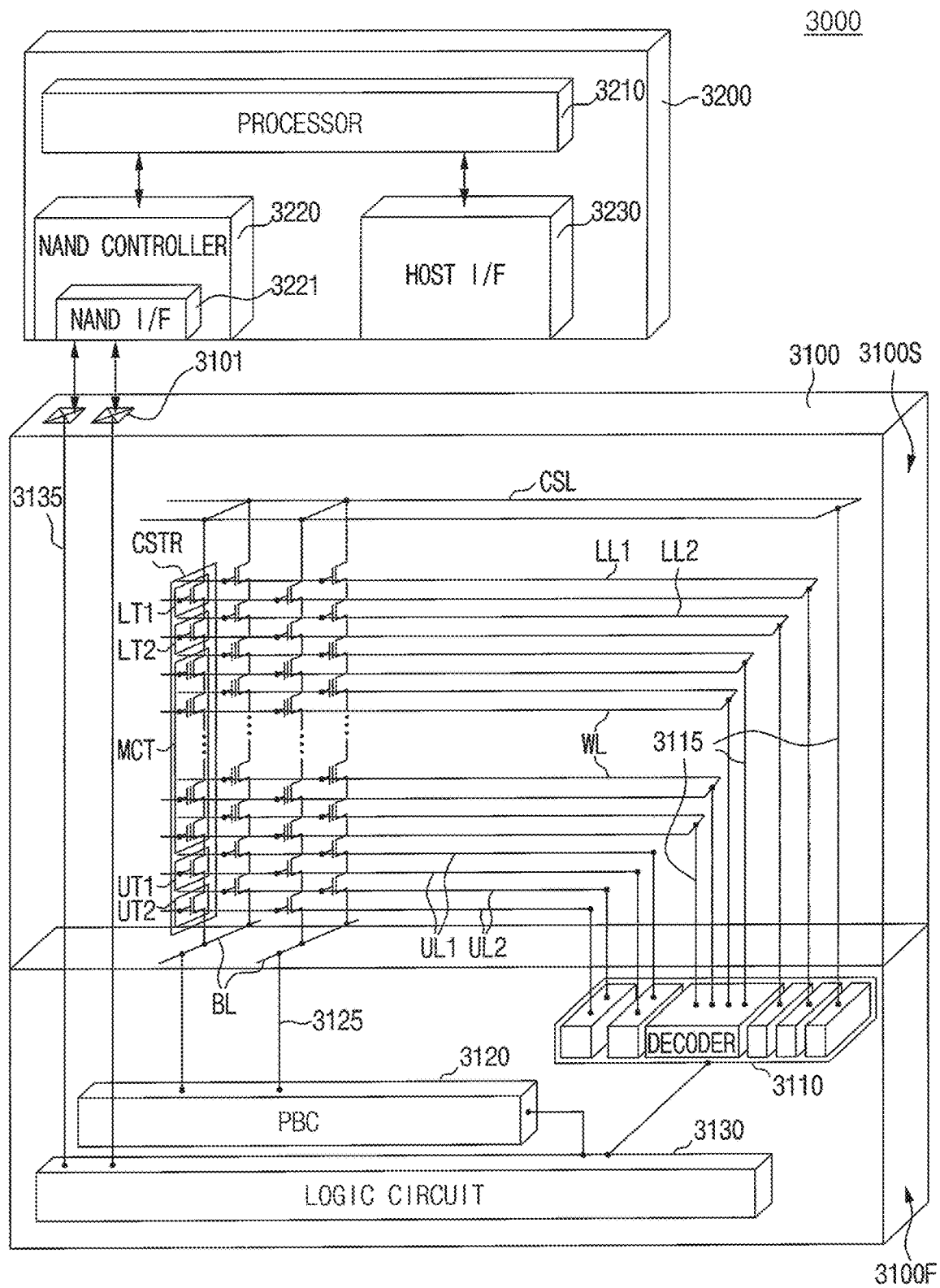
FIG. 21 is a block diagram illustrating an electronic system including a storage device according to example embodiments.

FIG. 21 is a block diagram illustrating an electronic system including a storage device according to example embodiments.

Referring to FIG. 21, an electronic system 3000 may include a semiconductor device 3100 and a controller 3200 electrically connected to the semiconductor device 3100. The electronic system 3000 may be a storage device including one or a plurality of semiconductor devices 3100 and/or an electronic device including a storage device. For example, the electronic system 3000 may be a solid state drive (SSD) device, a universal serial bus (USB), a computing system, a medical device, and/or a communication device that may include one or a plurality of semiconductor devices 3100.

The semiconductor device 3100 may be a memory device, for example, a nonvolatile memory device described with reference to FIG. 5. The semiconductor device 3100 may include a first structure 3100F and/or a second structure 3100S on the first structure 3100F. The first structure 3100F may be a peripheral circuit structure including a decoder circuit 3110, a page buffer circuit 3120, and/or a logic circuit 3130. The second structure 3100S may be a memory cell structure including a bitline BL, a common source line CSL, wordlines WL, first and second upper gate lines UL1 and UL2, first and/or second lower gate lines LL1 and LL2, and/or memory cell strings CSTR between the bitline BL and the common source line CSL.

In the second structure 3100S, each or one or more of the memory cell strings CSTR may include lower transistors LT1 and/or LT2 adjacent to the common source line CSL, upper transistors UT1 and/or UT2 adjacent to the bitline BL, and/or a plurality of memory cell transistors MCT between the lower transistors LT1 and/or LT2 and the upper transistors UT1 and/or UT2. The number of the lower transistors LT1 and/or LT2 and/or the number of the upper transistors UT1 and/or UT2 may be varied in accordance with example embodiments.

In some example embodiments, the upper transistors UT1 and/or UT2 may include string selection transistors, and/or the lower transistors LT1 and/or LT2 may include ground selection transistors. The lower gate lines LL1 and/or LL2 may be gate electrodes of the lower transistors LT1 and/or LT2, respectively. The wordlines WL may be gate electrodes of the memory cell transistors MCT, respectively, and/or the upper gate lines UL1 and/or UL2 may be gate electrodes of the upper transistors UT1 and/or UT2, respectively.

In some example embodiments, the lower transistors LT1 and/or LT2 may include a lower erase control transistor LT1 and/or a ground selection transistor LT2 that may be connected with each other in serial. The upper transistors UT1 and/or UT2 may include a string selection transistor UT1 and/or an upper erase control transistor UT2. At least one of the lower erase control transistor LT1 and/or the upper erase control transistor UT2 may be used in an erase operation for erasing data stored in the memory cell transistors MCT through gate induced drain leakage (GIDL) phenomenon.

The common source line CSL, the first and/or second lower gate lines LL1 and LL2, the wordlines WL, and/or the first and/or second upper gate lines UL1 and UL2 may be electrically connected to the decoder circuit 3110 through first connection wirings 1115 extending to the second structure 3110S in the first structure 3100F. The bitlines BL may be electrically connected to the page buffer circuit 3120 through second connection wirings 3125 extending to the second structure 3100S in the first structure 3100F.

In the first structure 3100F, the decoder circuit 3110 and/or the page buffer circuit 3120 may perform a control operation for at least one selected memory cell transistor among the plurality of memory cell transistors MCT. The decoder circuit 3110 and/or the page buffer circuit 3120 may be controlled by the logic circuit 3130. The semiconductor device 3100 may communicate with the controller 3200 through an input/output pad 3101 electrically connected to the logic circuit 3130. The input/output pad 3101 may be electrically connected to the logic circuit 3130 through an input/output connection wiring 3135 extending to the second structure 3100S in the first structure 3100F.

The controller 3200 may include a processor 3210, a NAND controller 3220, and/or a host interface 3230. The electronic system 3000 may include a plurality of semiconductor devices 3100, and in this case, the controller 3200 may control the plurality of semiconductor devices 3100.

The processor 3210 may control operations of the electronic system 3000 including the controller 3200. The processor 3210 may be operated by firmware, and may control the NAND controller 3220 to access the semiconductor device 3100. The NAND controller 3220 may include a NAND interface 3221 for communicating with the semiconductor device 3100. Through the NAND interface 3221, control command for controlling the semiconductor device 3100, data to be written in the memory cell transistors MCT of the semiconductor device 3100, data to be read from the memory cell transistors MCT of the semiconductor device 3100, etc., may be transferred. The host interface 3230 may provide communication between the electronic system 3000 and an outside host. When control command is received from the outside host through the host interface 3230, the processor 3210 may control the semiconductor device 3100 in response to the control command.

The electronic system 3000 may perform the method of managing the debugging log according to example embodiments described with reference to FIGS. 1 through 20.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The inventive concepts may be applied to various electronic devices and systems that include the storage devices and/or the storage systems. For example, the inventive concepts may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of managing a debugging log in a storage device, the method comprising:
   generating, by a storage controller included in the storage device, an event trigger signal based on an external power supply voltage and a plurality of configuration control signals, the event trigger signal being activated in response to an event of interest being issued for generating and storing the debugging log, the debugging log representing information associated with errors occurring in the storage device;
   generating, by the storage controller, the debugging log based on the event trigger signal; and
   storing the debugging log in a nonvolatile memory included in the storage device,
   wherein the event of interest includes a host idle event in which a host device outside the storage device maintains an idle state for more than a reference time interval and at least one of
      a power up event in which the external power supply voltage is activated,
      a reset event for initializing the storage controller,
      a link up event in which a communication establishment between the host device and the storage controller is completed,
      a link down event in which the communication establishment between the host device and the storage controller is released, or
      a power down event in which the external power supply voltage is deactivated.

2. The method of claim 1, wherein the event of interest further includes a thermal event in which an operating temperature of the storage device increases higher than a reference temperature.

3. The method of claim 1, wherein storing the debugging log in the nonvolatile memory includes:
   temporarily storing the debugging log in a buffer memory included in the storage device; and
   storing the debugging log in the nonvolatile memory by providing the debugging log that is temporarily stored in the buffer memory to the nonvolatile memory.

4. The method of claim 3, wherein:
   the debugging log is stored in a debugging memory block included in the nonvolatile memory, and
   the debugging memory block includes multi-level memory cells (MLCs) each of which stores two or more data bits.

5. The method of claim 1, wherein storing the debugging log in the nonvolatile memory includes:
   directly storing the debugging log in the nonvolatile memory by directly providing the debugging log that is generated by the storage controller to the nonvolatile memory.

6. The method of claim 5, further comprising:
   storing the debugging log in a debugging memory block included in the nonvolatile memory, the debugging memory block including single-level memory cells (SLCs) each of which is configured to store one data bit.

7. The method of claim 1, further comprising:
   generating, by the storage controller, an abnormal event trigger signal based on the external power supply voltage and the plurality of configuration control signals, the abnormal event trigger signal being activated in response to the event of interest corresponding to an abnormal event,
   wherein the debugging log is stored in the nonvolatile memory based on the abnormal event trigger signal.

8. The method of claim 7, wherein storing the debugging log in the nonvolatile memory includes:
   in response to the event of interest corresponding to the abnormal event, immediately storing the debugging log in the nonvolatile memory based on the abnormal event trigger signal; and
   in response to the event of interest corresponding to a normal event, temporarily storing the debugging log in a buffer memory included in the storage device, and then storing the debugging log in the nonvolatile memory.

9. The method of claim 7, further comprising:
   determining, in response to a time interval between a first time point and a second time point being greater than a first reference value, that the event of interest corresponds to the abnormal event,
   wherein the first time point represents a time point at which a reset signal associated with the reset event is activated, and
   wherein the second time point represents a time point at which the communication establishment between the host device and the storage controller is completed.

10. The method of claim 7, further comprising:
    determining, in response to a time interval between a first time point and a second time point being greater than a second reference value, that the event of interest corresponds to the abnormal event,
    wherein the first time point represents a time point at which a controller configuration enable signal provided from the host device to the storage controller is activated, and
    wherein the second time point represents a time point at which a controller status ready signal generated by the storage controller is activated.

11. The method of claim 7, further comprising:
    determining, in response to a time interval between a first time point and a second time point being greater than a third reference value, that the event of interest corresponds to the abnormal event,
    wherein the first time point represents a time point at which the communication establishment between the host device and the storage controller is released, and
    wherein the second time point represents a time point at which a reset signal associated with the reset event is deactivated.

12. The method of claim 1, wherein:
    the nonvolatile memory includes a plurality of memory blocks, and
    two or more of the plurality of memory blocks are set as a debugging memory block configured to store the debugging log.

13. The method of claim 12, further comprising:
    sequentially generating a plurality of debugging logs in response to a plurality of events of interest being sequentially issued;

sequentially storing first to M-th debugging logs among the plurality of debugging logs are in a first debugging memory block, where M is a natural number greater than or equal to two;

sequentially storing (M+1)-th to 2M-th debugging logs among the plurality of debugging logs in a second debugging memory block; and sequentially storing (2M+1)-th to 3M-th debugging logs among the plurality of debugging logs in the first debugging memory block after an erase operation is performed on the first debugging memory block.

14. A method of managing a debugging log in a storage device, the method comprising:

generating, by a storage controller included in the storage device, an event trigger signal based on an external power supply voltage and a plurality of configuration control signals, the event trigger signal being activated in response to an event of interest being issued for generating and storing the debugging log, the debugging log representing information associated with errors occurring in the storage device;

generating, by the storage controller, the debugging log based on the event trigger signal;

generating, by the storage controller, an abnormal event trigger signal based on the external power supply voltage and the plurality of configuration control signals, the abnormal event trigger signal being activated in response to the event of interest corresponding to an abnormal event;

in response to the event of interest corresponding to the abnormal event, immediately storing the debugging log in a nonvolatile memory included in the storage device based on the abnormal event trigger signal; and in response to the event of interest corresponding to a normal event, temporarily storing the debugging log in a buffer memory included in the storage device, and then storing the debugging log in the nonvolatile memory.

15. The method of claim 14, wherein the event of interest includes at least one of a power up event in which the external power supply voltage is activated, a reset event for initializing the storage controller, a link up event in which a communication establishment between a host device disposed outside the storage device and the storage controller is completed, a link down event in which the communication establishment between the host device and the storage controller is released, or a power down event in which the external power supply voltage is deactivated.

16. The method of claim 15, further comprising:

determining, in response to a time interval between a first time point and a second time point being greater than a first reference value, that the event of interest corresponds to the abnormal event, wherein the first time point represents a time point at which a reset signal associated with the reset event is activated, and wherein the second time point represents a time point at which the communication establishment between the host device and the storage controller is completed.

17. The method of claim 15, further comprising:

determining, in response to a time interval between a first time point and a second time point being greater than a second reference value, that the event of interest corresponds to the abnormal event, wherein the first time point represents a time point at which a controller configuration enable signal provided from the host device to the storage controller is activated, and wherein the second time point represents a time point at which a controller status ready signal generated by the storage controller is activated.

18. The method of claim 15, further comprising:

determining, in response to a time interval between a first time point and a second time point being greater than a third reference value, that the event of interest corresponds to the abnormal event, wherein the first time point represents a time point at which the communication establishment between the host device and the storage controller is released, and wherein the second time point represents a time point at which a reset signal associated with the reset event is deactivated.

19. A method of managing a debugging log in a storage device, the method comprising:

generating, by a storage controller included in the storage device, an event trigger signal based on an external power supply voltage and a plurality of configuration control signals, the event trigger signal being activated in response to a plurality of events of interest being issued for generating and storing a plurality of debugging logs, the plurality of debugging logs representing information associated with errors occurring in the storage device;

generating, by the storage controller, the plurality of debugging logs based on the event trigger signal;

storing the plurality of debugging logs in a nonvolatile memory included in the storage device, the nonvolatile memory including a plurality of memory blocks, two of the plurality of memory blocks being set as a first debugging memory block and a second debugging memory block, the first and second debugging memory blocks configured to store the plurality of debugging logs;

sequentially storing first to M-th debugging logs among the plurality of debugging logs in the first debugging memory block, where M is a natural number greater than or equal to two;

sequentially storing (M+1)-th to 2M-th debugging logs among the plurality of debugging logs in the second debugging memory block; and sequentially storing (2M+1)-th to 3M-th debugging logs among the plurality of debugging logs in the first debugging memory block after an erase operation is performed on the first debugging memory block.

* * * * *